(12) United States Patent
Teranishi

(10) Patent No.: US 8,041,944 B2
(45) Date of Patent: Oct. 18, 2011

(54) GROUP SIGNATURE SYSTEM AND INFORMATION PROCESSING METHOD

(75) Inventor: Isamu Teranishi, Tokyo (JP)

(73) Assignee: NEC Corporation, Tokyo (JP)

( * ) Notice: Subject to any disclaimer, the term of this patent is extended or adjusted under 35 U.S.C. 154(b) by 618 days.

(21) Appl. No.: 12/225,124

(22) PCT Filed: Mar. 14, 2007

(86) PCT No.: PCT/JP2007/055025
§ 371 (c)(1),
(2), (4) Date: Sep. 15, 2008

(87) PCT Pub. No.: WO2007/105749
PCT Pub. Date: Sep. 20, 2007

(65) Prior Publication Data
US 2009/0276630 A1 Nov. 5, 2009

(30) Foreign Application Priority Data
Mar. 16, 2006 (JP) .................................. 2006-072856

(51) Int. Cl.
*H04L 9/08* (2006.01)
(52) U.S. Cl. .......................... 713/158; 713/176; 380/286
(58) Field of Classification Search .................... 713/158
See application file for complete search history.

(56) References Cited

FOREIGN PATENT DOCUMENTS

| JP | 2004-228958 A | 8/2004 |
| JP | 2004-334126 A | 11/2004 |
| JP | 2005-210638 A | 8/2005 |

OTHER PUBLICATIONS

Ateniese, Giuseppe, "Verifiable Encryption of Digital Signatures and Applications", Feb. 2004, ACM Transactions on Information and System Security, vol. 7, No. 1, pp. 1-20.*
Song, Dawn Xiaodong, "Practical Forward Secure Group Signature Schemes", Nov. 5, 2001, ACM, pp. 225-234.*
Boneh et al., "Group Signatures with Verifier-Local Revocation", Oct. 25, 2004, ACM, pp. 168-177.*
Popescu et al., "A Group Signature Scheme With Revocation", Jul. 2, 2003, EC-VIP-MC 2003, 4th EURASIP Conference, pp. 245-250.*

(Continued)

*Primary Examiner* — Matthew Smithers
(74) *Attorney, Agent, or Firm* — Foley & Lardner LLP

(57) ABSTRACT

In a group signature system of the present invention, user device 400 registered in the group, when receiving an issuing device public key of a set that includes order N of a cyclic group and its elements $a\_0$, $a\_1$ and $a\_2$, determines such primes e and e' that e' is a prime that is obtained by subtracting a fixed number smaller than the prime e from the prime e, generates a user device secret key of a set including such numbers x and r that the product between $a\_0$ and the result obtained by performing modular exponentiation of $a\_1$ by number x, multiplied by the result obtained by performing modular exponentiation of $a\_2$ by number r is equal to the result obtained by performing element A of the first cyclic group raised to the e-th power, based on order N as a modulus, and a user device public key of a set including prime e, prime e' and element A, transmits prime e' to revocation manager 300, receives B calculated based on prime e' from revocation manager 300 to obtain a message, generates a signature statement for the message using the B value, the user device public key, the user device secret key and the message, and transmits the signature statement with the message and to verifying device 500.

18 Claims, 28 Drawing Sheets

OTHER PUBLICATIONS

Yan-Hua et al., "Efficient Group Signature Scheme Based on RSA Cryptosystem", 2006, IEEE, pp. 1-3.*

J. Camenisch et al., "Group Signatures: Better Efficiency and New Theoretical Aspects," SCN 2004, LNCS 3352, 2005, pp. 120-133.

G. Ateniese et al., "A Practical and Provably Secure Coalition-Resistant Group Signature Scheme," in Advances in Cryptology—CRYPTO 2000, vol. 1880 of LNCS, pp. 255-270, Springer-Verlag 2000.

* cited by examiner

FIG.2
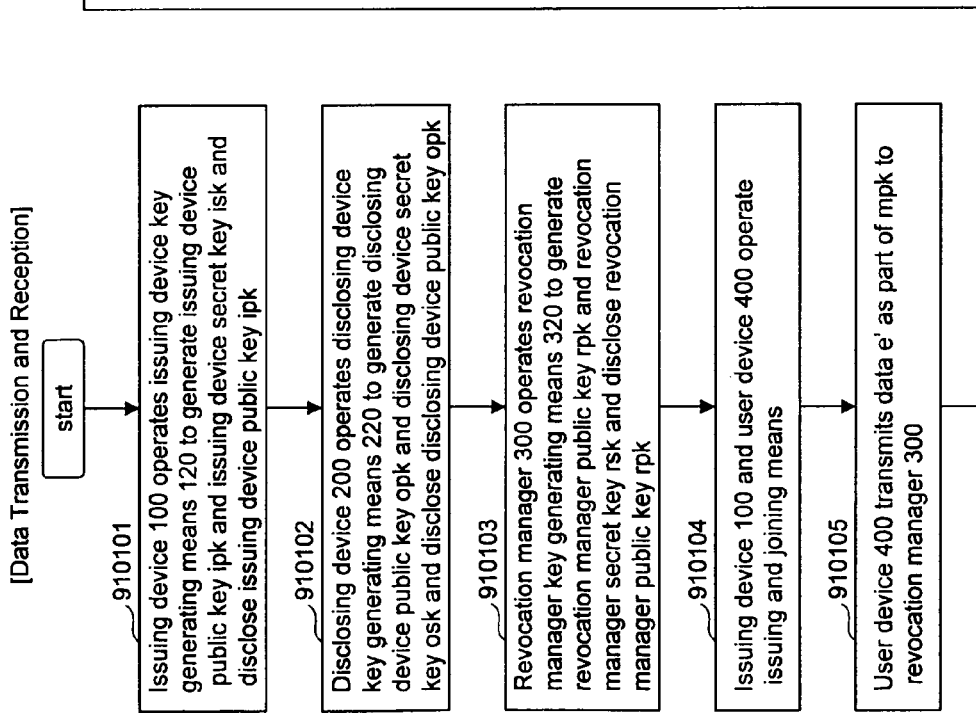
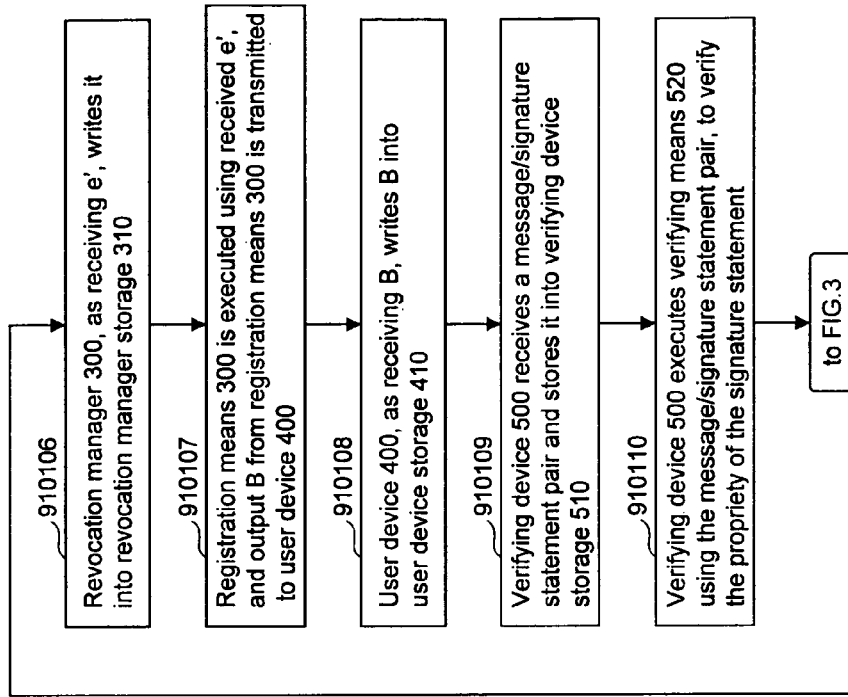

FIG.28 [Issuing and Joining Means]
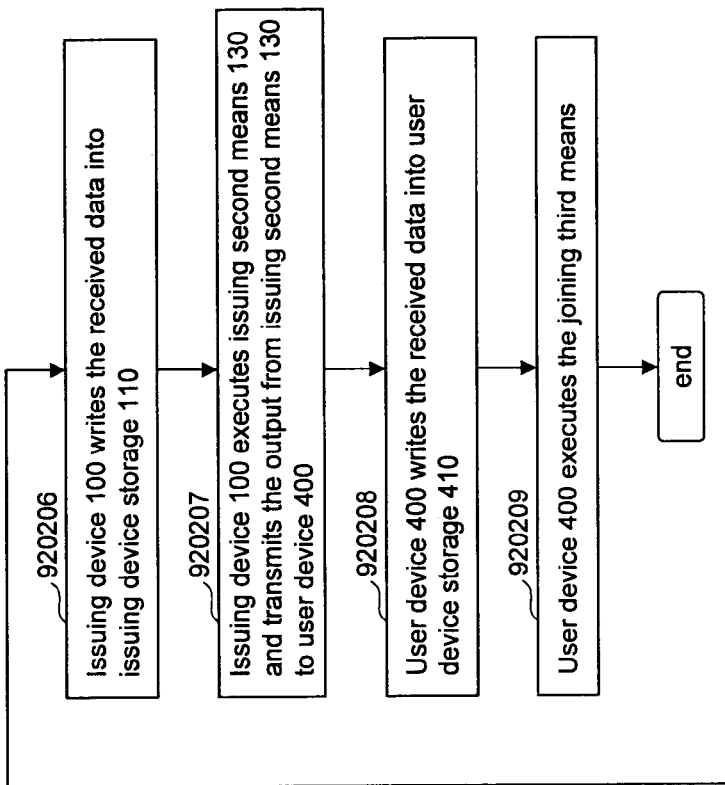
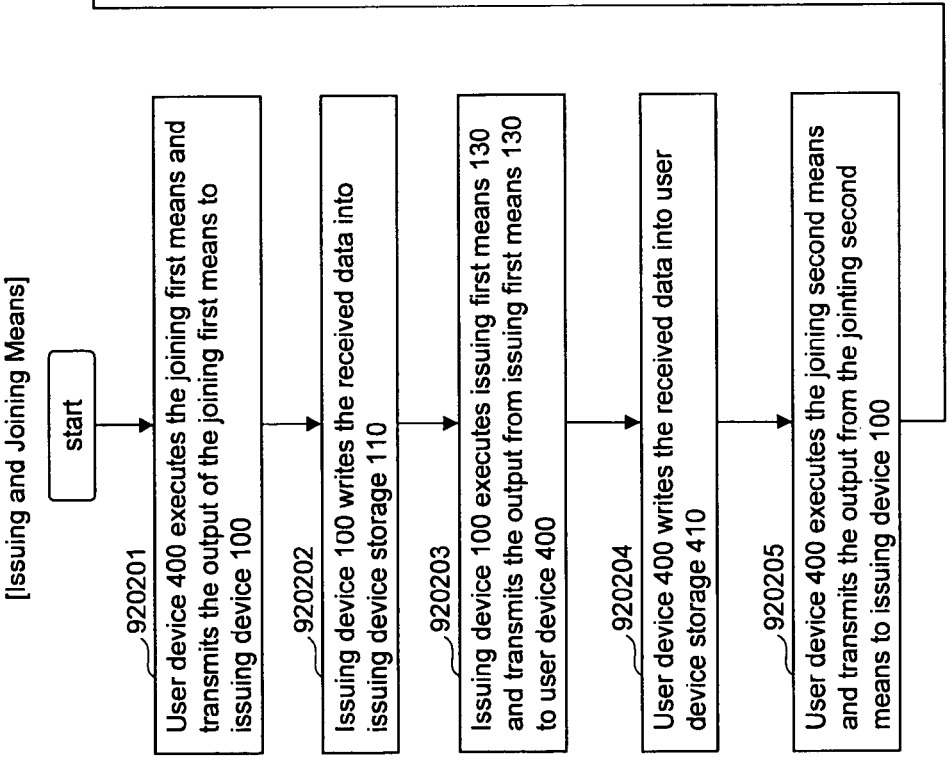

FIG.34

[Signature Means 440]

start

440201: reads $k=(k\_N, k\_L, k\_q, k\_e, k'\_e, k\_c, k\_S)$, ipk= $(N, a\_0, a\_1, a\_2)$, opk, q, rpk=$(L,b,w)$, mpk=$(A,e,e',h)$, msk=x and B 440202: reads message M 440203: selects an element $\rho\_\{Cipher\}$ of $Z\_q$ at random and calculates Cipher by using [ciphering means]

440204: selects a natural number s of $k\_N/2$ bits at random and calculates $A\_\{COM\}=Aa\_2\char`\^\{s\}$ mod N 440205: selects a natural number $\rho\_\{rev\}$ of $k\_L/2$ bits at random and calculates $B\_\{COM\}=Bw\char`\^\{\rho\_\{rev\}\}$ mod L 440206: calculates $t=e'\rho\_\{rev\}$ 440207: selects a natural number $\mu\_x$ of $k\_Q+k\_c+k\_S$ bits, a natural number $\mu\_s$ of $(k\_N/2)+k\_c+k\_S$ bits, a natural number $\mu'\_e$ of $k'\_e+k\_c+k\_S$ bits, a natural number $\mu\_t$ of $(k\_L/2)+k\_c+k\_S$ bits, an element $m\_\{Cipher\}$ of $Z\_q$, a natural number $\mu\_\{mpk\}$ of $(k\_N/2)+k\_c+k\_S$ bits and a natural number $\mu\_\{rev\}$ of $(k\_L/2)+k\_c+k\_S$ bits, at random 440208: executes [cipher statement commit means] with input of Cipher, $\mu\_x$, $\mu\_\{Cipher\}$, opk and g to acquire its output COM_{Cipher}

440209: executes [member public key commit means] with input of $\mu\_x$, $\mu\_s$, $\mu'\_e$, $A\_\{COM\}$ and ipk to acquire its output COM_{mpk}

To FIG.35

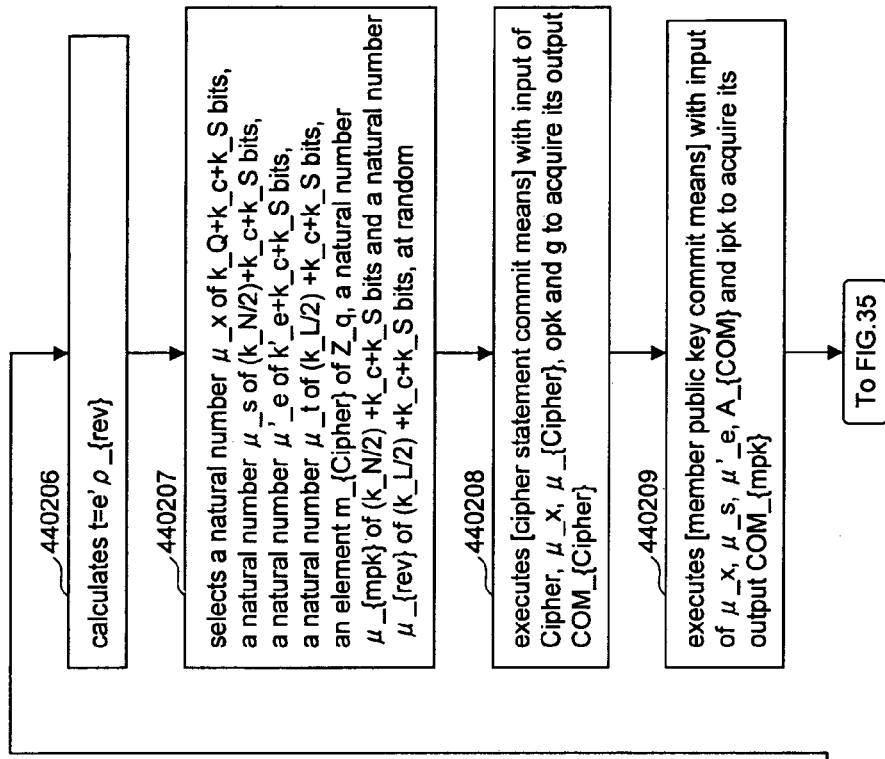
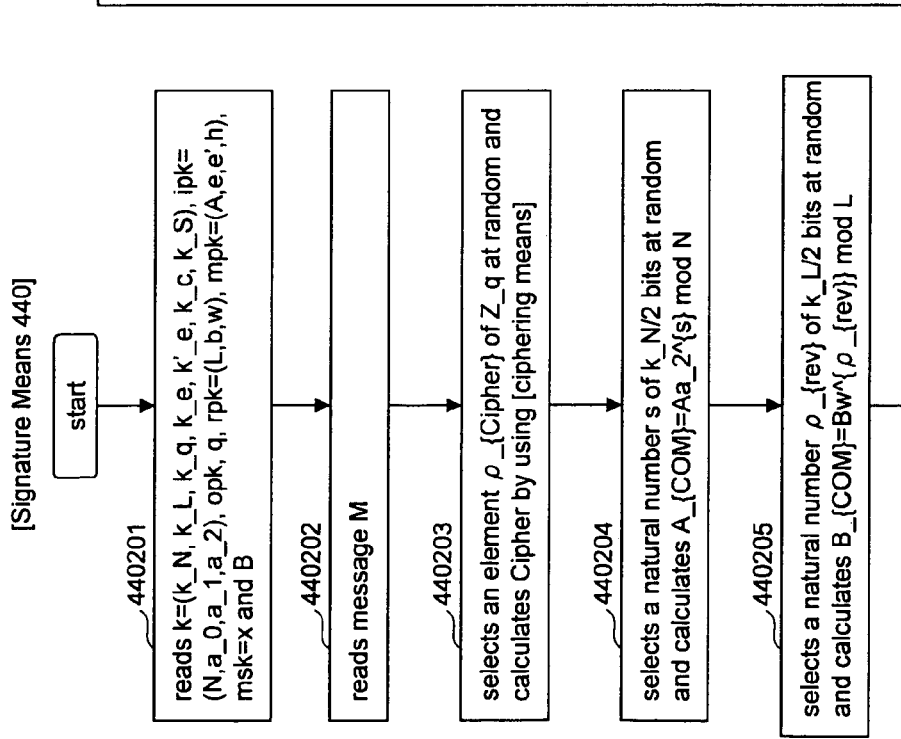

GROUP SIGNATURE SYSTEM AND INFORMATION PROCESSING METHOD

This application is the National Phase of PCT/JP2007/055025, filed Mar. 14, 2007, which claims priority to Japanese Application No. 2006-072856, filed Mar. 16, 2006, the disclosures of which are hereby incorporated by reference in their entirety.

TECHNICAL FIELD

The present invention relates to a group signature system and an information processing method wherein calculation for having a user device leave from membership can be done efficiently.

BACKGROUND ART

A group signature scheme is a scheme that allows the members of a group to sign anonymously. Since this scheme can be applied to electronic voting, anonymous delegation and ID escrow, it is of high utility value in industries.

A conventional system for a group signature scheme includes an issuing device, a user device and a verifying device, these devices being connected so as to communicate with each other. When a user device accesses the authority called the issuing device to execute the procedure of joining means, the issuing device executes the procedure called an issuing procedure to enable the user device to become a member of the group. The user device as a member of the group can create a signature statement as a member of the group. The verifying device can verify the validity of the signature statement but cannot identify the device that created the signature statement. However, the authority called a disclosing device alone can identify the device that created the signature statement.

Other than the above configuration, there is a scheme, which has a revocation function. The group signature scheme having a revocation function needs to have an authority called a revocation manager. When a user device becomes a member of the group, it also accesses the revocation manager to execute registration means. When the user device leaves the group, the revocation manager executes revocation means to make the user device leave the group.

When some user devices left the group, the remaining user devices update the public/secret key pair held in their own by executing key updating means. One of the group signature schemes having a revocation function is proposed in "Jan Camenish. Jens Groth. Group Signatures: Better Efficiency and New Theoretical Aspects. SCN 2004, vol. 3352 of LNCS, pp. 120-133, 2004" (which will be referred to hereinbelow as document 1).

Another group signature scheme is proposed in "G. Ateniese, J. Camenish, M. Joye, and G. Tsudik. A Practical and Provably Secure Coalition-Resistant Group Signature Scheme. In Advances in Cryptology—CRYPTO 2000, vol. 1880 of LNCS. pp. 255-270, Springer-Verlag, 2000."

DISCLOSURE OF INVENTION

Since the key updating means is a procedure which has to be done whenever a user device leaves from the group, the user devices remaining in the group have to execute the key updating means very often. Therefore, it is preferred that the amount of calculation in the key updating means is as low as possible when a group signature scheme is actually operated. Here, the situation is the same in registration means when a user device newly joins the group as well as in revocation means when a user device leaves the group.

The present invention has been devised in order to solve the aforementioned problems entailed with the conventional technology, it is therefore an object of the present invention to provide a group signature system and an information processing method wherein the amount of calculation at information processing when a user device is registered to the group or leaves the group is reduced.

The group signature system of the present invention for achieve the above object is a group signature system including an issuing device, a disclosing device, a revocation manager, a user device and a verifying device, the devices being connected to each other via a network, the issuing device including an issuing device storage in which elements of the first cyclic group are stored, and an issuing device controller, which, when issuing device public key ipk of a set that includes order N of the first cyclic group and elements $a\_0$, $a\_1$ and $a\_2$ of the first cyclic group is generated, discloses the issuing device public key ipk, the user device including a user device storage in which a set of primes are stored, and a user device controller which, when receiving the disclosed issuing device public key ipk, determines such primes e and e' that e' is a prime that is obtained by subtracting a fixed number smaller than the prime e from the prime e, generates user device secret key msk of a set including such numbers x and r that the product between the $a\_0$ and the result obtained by performing modular exponentiation of the $a\_1$ by number x, multiplied by the result obtained by performing modular exponentiation of the $a\_2$ by number r, is equal to the result obtained by performing element A of the first cyclic group raised to the power of the prime e, based on the order N as a modulus, and user device public key mpk of a set including the prime e, the prime e' and the element A, transmits the prime e' to the revocation manager, and when receiving B calculated based on the prime e' from the revocation manager to obtain a message, generates a signature statement for the message using the B value, the user device public key mpk, the user device secret key msk and the message, and transmits the message and the signature statement to the verifying device, the revocation manager including: a revocation manager storage in which the second cyclic group is stored, and a revocation manager controller which generates revocation manager public key rpk of a set including order L of the second cyclic group and element b of the second cyclic group, and when receiving from the prime e' from the user device, calculates the B value that is obtained by performing modular exponentiation of the element b raised to the power of the inverse of the prime e' based on the order L as a modulus, and transmits it to the user device, the verifying device including a verifying device storage for storing the message and the signature statement, and a verifying device controller which, when receiving the message and the signature statement, performs verification using the message and the signature statement candidate to verify the validity of the signature statement candidate and outputs whether the signature statement candidate is valid or not, and the disclosing device including a disclosing device storage for storing the message and the signature statement, and a disclosing device controller which, when receiving the message and the signature statement to confirm that the signature is valid, calculates h by decoding based on the message, the signature statement, the generated disclosing device public key opk and disclosing device secret key osk and outputs it.

Further, the group signature system of the present invention is a group signature system including an issuing device, a disclosing device, a revocation manager, a user device and a verifying device, the devices being connected to each other via a network, the issuing device including an issuing device storage in which elements of the first cyclic group are stored, and an issuing device controller, which, when issuing device public key ipk of a set that includes order N of the first cyclic group and elements a_0 and a_1 of the first cyclic group is generated, discloses the issuing device public key ipk, the user device including a user device storage in which a set of primes are stored, and a user device controller which, when receiving the disclosed issuing device public key ipk, determines such primes e and e' that e' is a prime that is obtained by subtracting a fixed number smaller than the prime e from the prime e, generates user device secret key msk including such number x that the product between the a_0 and the result obtained by performing modular exponentiation of the a_1 by number x is equal to the result obtained by performing element A of the first cyclic group raised to the power of the prime e, based on the order N as the modulus, and user device public key mpk of a set including the prime e, the prime e' and the element A, transmits the prime e' to the revocation manager, and when receiving B calculated based on the prime e' from the revocation manager to obtain a message, generates a signature statement for the message using the B value, the user device public key mpk, the user device secret key msk and the message, and transmits the message and the signature statement to the verifying device, the revocation manager including: a revocation manager storage in which the second cyclic group is stored, and a revocation manager controller which generates revocation manager public key rpk of a set including order L of the second cyclic group and element b of the second cyclic group, and when receiving from the prime e' from the user device, calculates the B value that is obtained by performing modular exponentiation of the element b raised to the power of the inverse of the prime e' based on the order L as a modulus, and transmits it to the user device, the verifying device including a verifying device storage for storing the message and the signature statement, and a verifying device controller which, when receiving the message and the signature statement, performs verification using the message and the signature statement candidate to verify the validity of the signature statement candidate and outputs whether the signature statement candidate is valid or not, and the disclosing device including a disclosing device storage for storing the message and the signature statement, and a disclosing device controller which, when receiving the message and the signature statement to confirm that the signature is valid, calculates h by decoding based on the message, the signature statement, the generated disclosing device public key opk and disclosing device secret key osk and outputs it.

Also, the information processing method of the present invention is an information processing method based on a group signature system including an issuing device, a disclosing device, a revocation manager, a user device and a verifying device, the devices being connected to each other via a network, comprising the steps of: the issuing device, when generating issuing device public key ipk of a set that includes order N of the first cyclic group and elements a_0, a_1 and a_2 of the first cyclic group, disclosing the issuing device public key ipk; the user device, when receiving the disclosed issuing device public key ipk, determining such primes e and e' that e' is a prime that is obtained by subtracting a fixed number smaller than the prime e from the prime e; generating user device secret key msk of a set including such numbers x and r that the product between the a_0 and the result obtained by performing modular exponentiation of the a_1 by number x, multiplied by the result obtained by performing modular exponentiation of the a_2 by number r, is equal to the result obtained by performing element A of the first cyclic group raised to the power of the prime e, based on the order N as a modulus, and user device public key mpk of a set including the prime e, the prime e' and the element A; transmitting the prime e' to the revocation manager; the revocation manager generating revocation manager public key rpk of a set including order L of the second cyclic group and element b of the second cyclic group; and when receiving from the prime e' from the user device, calculating the B value that is obtained by performing modular exponentiation of the element b raised to the power of the inverse of the prime e' based on the order L as a modulus, and transmitting it to the user device; the user device, when receiving the B value from the revocation manager and have a message input, generating a signature statement for the message using the B value, the user device public key mpk, the user device secret key msk and the message; and transmitting the message and the signature statement to the verifying device; the verifying device, when receiving the message and the signature statement, performing verification using the message and the signature statement candidate to verify the validity of the signature statement candidate and outputting whether the signature statement candidate is valid or not; and the disclosing device, when receiving the message and the signature statement and confirming that the signature statement is valid, calculating h by decoding based on the message, the signature statement, the generated disclosing device public key opk and disclosing device secret key osk and outputting it.

Further, the information processing method of the present invention is an information processing method based on a group signature system including an issuing device, a disclosing device, a revocation manager, a user device and a verifying device, the devices being connected to each other via a network, comprising the steps of: the issuing device, when generating issuing device public key ipk of a set that includes order N of the first cyclic group and elements a_0 and a_1 of the first cyclic group, disclosing the issuing device public key ipk; the user device, when receiving the disclosed issuing device public key ipk, determining such primes e and e' that e' is a prime that is obtained by subtracting a fixed number smaller than the prime e from the prime e; generating user device secret key msk including such number x that the product between the a_0 and the result obtained by performing modular exponentiation of the a_1 by number x is equal to the result obtained by performing element A of the first cyclic group raised to the power of the prime e, based on the order N as a modulus, and a user device public key mpk of a set including the prime e, the prime e' and the element A; transmitting the prime e' to the revocation manager; the revocation manager generating revocation manager public key rpk of a set including order L of the second cyclic group and element b of the second cyclic group; and when receiving from the prime e' from the user device, calculating the B value that is obtained by performing modular exponentiation of the element b raised to the power of the inverse of the prime e' based on the order L as a modulus, and transmitting it to the user device; the user device, when receiving the B value from the revocation manager and have a message input, generating a signature statement for the message using the B value, the user device public key mpk, the user device secret key msk and the message; and transmitting the message and the signature statement to the verifying device; the verifying device, when receiving the message and the signature statement, performing verification using the message and the signature statement candidate to verify the validity of the signature statement candidate and outputting whether the signature statement candidate is valid or not; and the disclosing device, when receiving the message and the signature statement and confirming that the signature statement is valid, calculating h by decoding based on the message, the signature statement, the generated disclosing device public key opk and disclosing device secret key osk and outputting it.

In the present invention, use of e' different from a conventional prime e having long number of bits by the user device enables reduction of the amount of calculation for generation of secret keys and public keys. The amount of calculation in the revocation manager for calculating the information as to registration of a user device using this e' value is also decreased. Accordingly, the amount of calculation for registering a user device that newly joins to the group can be reduced compared to the conventional configuration.

BRIEF DESCRIPTION OF THE DRAWINGS

FIG. 2 is a flow chart showing transmission and reception of data in exemplary embodiment 1.

FIG. 28 is flow chart showing an issuing and joining means of exemplary embodiment 2.

FIG. 34 is a flow chart showing a signature means of exemplary embodiment 2.

Figure 1:
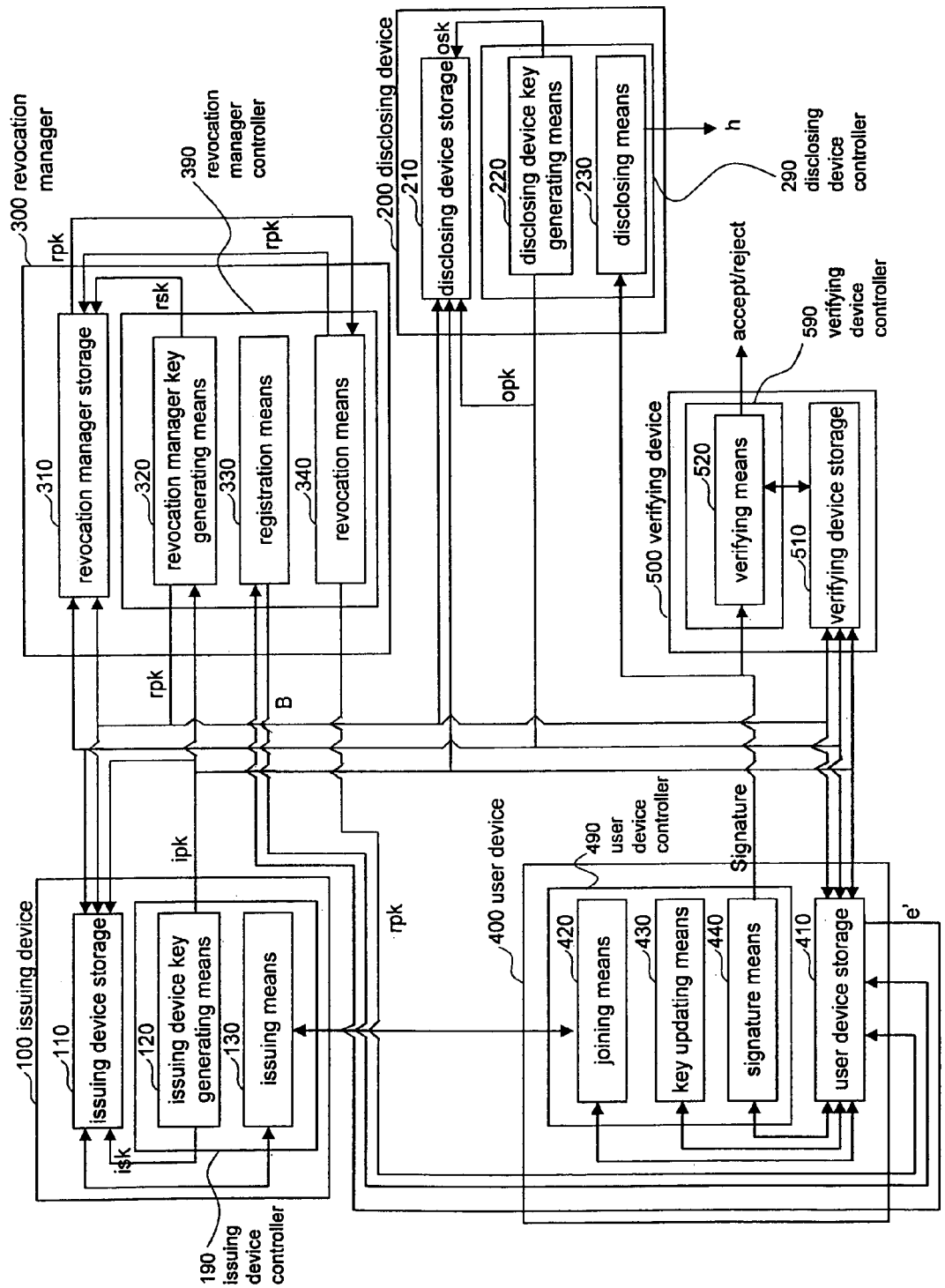
FIG. 1 is a block diagram showing one configurational example of a group signature system of exemplary embodiment 1.

DESCRIPTION OF REFERENCE NUMERALS 100 issuing device
200 disclosing device
300 revocation manager
400 user device
500 verifying device

BEST MODE FOR CARRYING OUT THE INVENTION

Exemplary Embodiment 1

[System Configuration]

The configuration of a group signature system of the present exemplary embodiment will be described. FIG. 1 is a block diagram showing one configurational example of a group signature system of exemplary embodiment 1. As shown in FIG. 1, the group signature system includes issuing device 100, disclosing device 200, revocation manager 300, user device 400 and verifying device 500.

Issuing device 100 includes issuing device controller 190, issuing device storage 110 and an issuing device communication means (not shown). Issuing device controller 190 includes issuing device key generating means 120 and issuing means 130.

Disclosing device 200 includes disclosing device controller 290, disclosing device storage 210 and a disclosing device communication means (not shown). Disclosing device controller 290 includes disclosing device key generating means 220 and disclosing means 230.

Revocation manager 300 includes revocation manager controller 390, revocation manager storage 310 and a revocation manager communication means (not shown). Revocation manager controller 390 includes revocation manager key generating means 320, registration means 330 and revocation means 340.

User device 400 includes user device controller 490, user device storage 410 and a user device communication means (not shown). User device controller 490 includes joining means 420, key updating means 430 and signature means 440. Though user device 400 can be connected to communicate to as many number of other user devices 400 that belong to the group, only a single user device is shown in FIG. 1 in the exemplary embodiment for description simplicity.

Verifying device 500 includes verifying device controller 590, verifying device storage 510 and a verifying device communication means (not shown). Verifying device controller 590 includes verifying means 520.

[Device Implementation]

The controller of each device performs control of the communication portion, control of the storage and data processing. The controller includes a CPU (Central Processing Unit) for executing predetermined processes in accordance with programs and memory for storing the programs. The means of each controller is virtually constructed inside the device when the CPU executes the programs.

The storage in each device may use a hard disk, semiconductor memory and others.

Each device is connected to others via a communication network. As the communication network, the internet and LANs (Local Area Networks) can be used. The communication network may be either wired or wireless, or of a combination of wired and wireless network. In FIG. 1, in order to clarify the information flows between the devices, the communication portion in each device is unillustrated.

[Symbol]

$k=(k\_N, k\_L, k\_q, k\_e, k'\_e, k\_c, k\_S)$ represents security parameters, and it is assumed that $k'\_e < k\_e$ holds.

From a safety viewpoint, it is preferred that $k'\_e+k\_c+k\_S<k\_q$ and $k\_q+k\_c+k\_S<k\_e<k\_N/2$ hold.

For a natural number N, a cyclic group $\{0, \ldots, N-1\}$ of order N is written as Z_N and the set of whole quadratic residues over Z_N is written as QR(N).

U is assumed to represent a limited cyclic group, g an element of U, and q the order of U.

Though any can be selected as U, a subgroup of the multiplicative group Z_p for a certain prime p, or a subgroup of an elliptic curve group is preferably selected from a safety viewpoint.

Hash is assumed to be a Hash function taking a value of $\{0, \ldots m2^{\{k\_c\}}\}$.

[Data Transmission and Reception]

It is assumed that each device holds the detail of U, k, g and q in its own storage, in advance. It does not matter how these data are shared.

Figure 3:
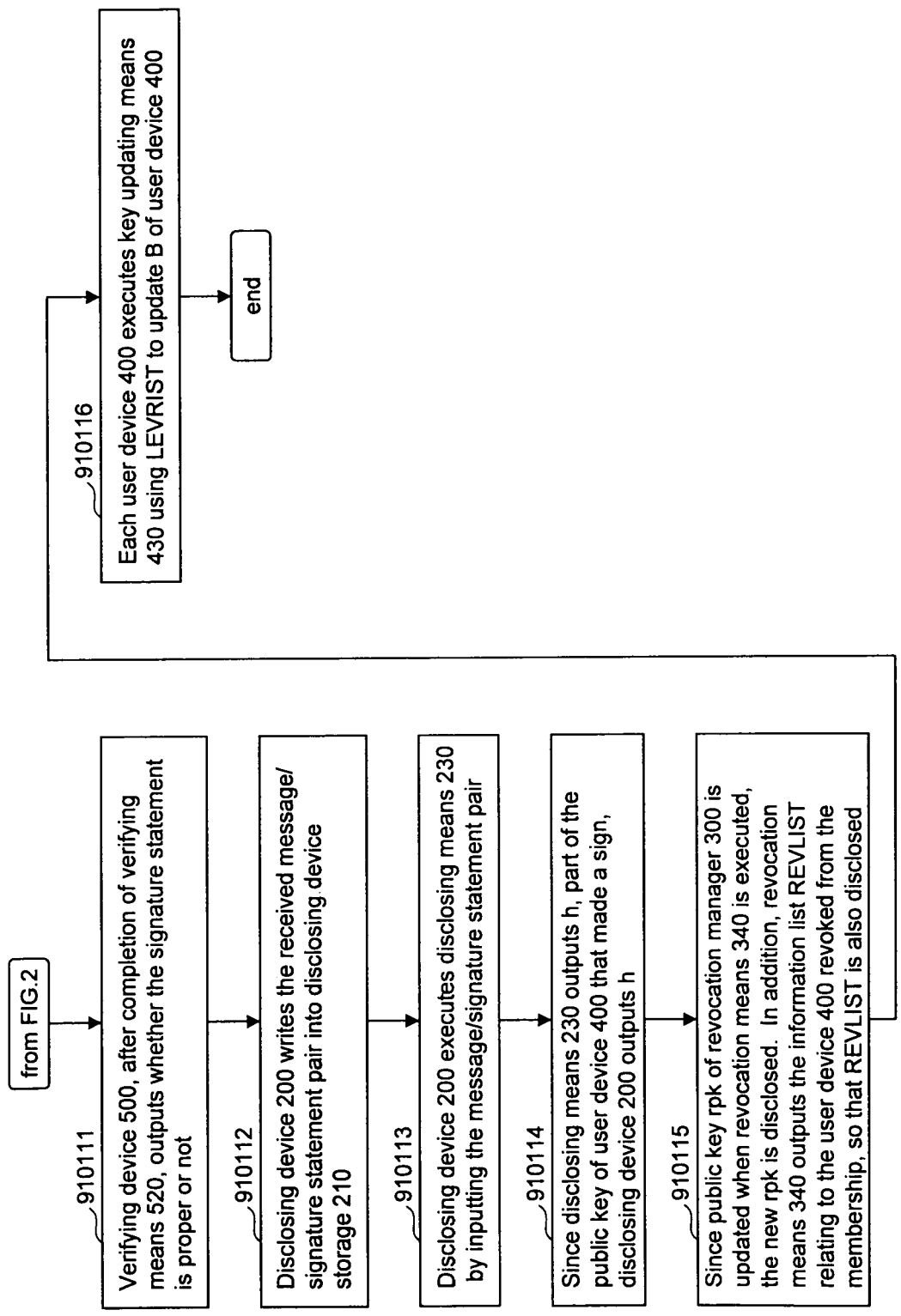
FIG. 3 is a flow chart showing transmission and reception of data in exemplary embodiment 1.

In the present invention, Prot1-1, ..., Prot1-16 are executed (FIGS. 2 and 3).

Prot1-1: Issuing device 100 operates issuing device key generating means 120 to generate issuing device public key ipk and issuing device secret key isk and disclose issuing device public key ipk (Step 910101).

Prot1-2: Disclosing device 200 operates disclosing device key generating means 220 to generate disclosing device public key opk and disclosing device secret key osk and disclose disclosing device public key opk (Step 910102).

Prot1-3: Revocation manager 300 operates revocation manager key generating means 320 to generate revocation manager public key rpk and revocation manager secret key rsk and disclose revocation manager public key rpk (Step 910103).

It does not matter how to disclose the public keys. As the method of disclosure, use of PKI or sending the public key directly to each device may be considered, for example. In the procedures hereinbelow, it is assumed that all the devices have ipk, opk and rpk stored in their own storages.

Prot1-4: Issuing device 100 and user device 400 operate issuing and joining means (Step 910104). The issuing and joining means includes the procedure executed by issuing device 100 and the procedure executed by user device 100, the former being called issuing means 130 and the latter joining means 420.

When the issuing and joining means is completed, issuing device 100 acquires public key mpk of user device 400 while user device 400 acquires public key mpk and secret key msk of its own.

The user device 400 which has completed the issuing and joining means is also called a group member.

Prot1-5: User device 400 transmits data e' as part of mpk to revocation manager 300 (Step 910105).

Prot1-6: Revocation manager 300, as receiving e', writes it into revocation manager storage 310 (Step 9101106).

Prot1-7: Registration means 300 is executed using received e', and output B from registration means 300 is transmitted to user device 400 (Step 910107).

Prot1-8: User device 400, as receiving B, writes B into user device storage 410 (Step 910108).

User device 400 being a group member can sign a message by executing signature means 440. It does not matter how and who selects a message and how the message is input to user device 400. For example, there is such a method that the person who operates user device 400 inputs a message to the user device through a keyboard.

Prot1-9: Verifying device 500 receives a message/signature statement pair and stores it into verifying device storage 510 (Step 910109).

Prot1-10: Verifying device 500 executes verifying means 520 using the message/signature statement pair, to verify the propriety of the signature statement (Step 910110).

Prot1-11: Verifying device 500, after completion of verifying means 520, outputs whether the signature statement is proper or not (Step 910111).

It does not matter when and how verifying device 500 received the signature statement. For example, there is such a method that user device 400 transmits the signature statement to verifying device 500 via the internet.

The present exemplary embodiment is explained such that a character string "accept" is output if the signature statement is proper; a character string "reject" is output if not. However, other character strings or data other than character strings may be output. This situation is the same as the other exemplary embodiments.

Disclosing device 200 receives the message/signature statement pair in some manner. It does not matter how the message/signature statement pair was acquired. For example, there is such a method that verifying device 500 transmits it to disclosing device 200 via the internet.

Prot1-12: Disclosing device 200 writes the received message/signature statement pair into disclosing device storage 210 (Step 910112).

Prot1-13: Disclosing device 200 executes disclosing means 230 by inputting the message/signature statement pair (Step 910113).

Prot1-14: Since disclosing means 230 outputs h, part of the public key of user device 400 that made a sign, disclosing device 200 outputs h (Step 910114).

Revocation manager 300 receives e' of user device 400 that is wanted to leave from the group and executes revocation means 340, whereby the user device 400 can be made to leave the group.

Prot1-15: Since public key rpk of revocation manager 300 is updated when revocation means 340 is executed, the new rpk is disclosed. In addition, revocation means 340 outputs the information list REVLIST relating to the user device 400 revoked from the membership, so that REVLIST is also disclosed (Step 910115).

It does not matter how to disclose LEVRIST and the new rpk. As the method of disclosure, use of PKI or sending the public key directly to each device may be considered, for example. In the procedures hereinbelow, it is assumed that all the devices have REVLIST and new rpk stored in their own storages.

Port1-16: Each user device 400 executes key updating means 430 using LEVRIST to update B of user device 400 (Step 910116).

[Member Public Key List]

When the present invention is used, it is necessary to disclose the IDs of the user devices being group members and the public keys mpk of the user devices. Though it does not matter who discloses the list and how the list is disclosed, it is necessary to guarantee that the data in the list is correct.

One method for assuring the correctness of the data in the list will be described. The list is managed by issuing device 100. In the list, not only ID and mpk but also the signature statement (created using the public key for PKI) of the user device 400 for the ID and mpk is published.

The publication is done such that the entire list is signed (using the PKI public key) and the list and signature statement is disclosed. When the disclosing device outputs h, mpk that contains h as its part is located out from the list to search the ID corresponding to the mpk, whereby it is possible to identify the user device 400 of the signature.

[Issuing Device Key Generating Means 120]

Figure 4:
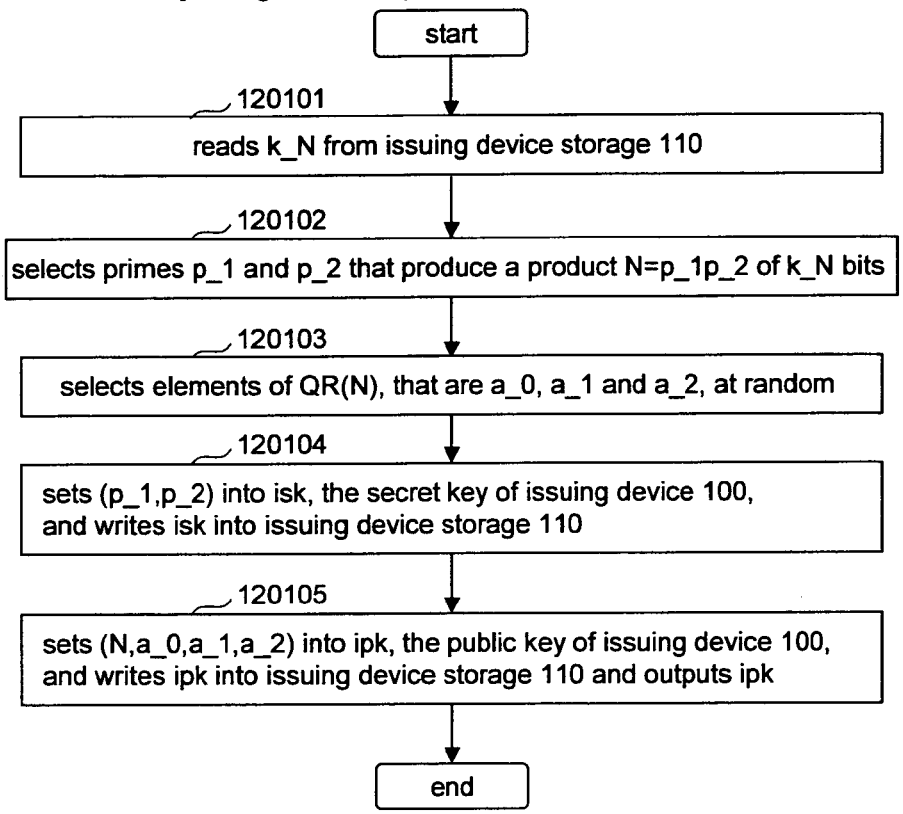
FIG. 4 is a flow chart showing an issuing device key generating means of exemplary embodiment 1.

Issuing device 100 sequentially executes ISSGEN1-1 . . . , ISSGEN1-5 as follows (FIG. 4).

ISSGEN1-1: $k\_N$ is read from issuing device storage 110 (Step 120101);

ISSGEN1-2: Primes $p\_1$ and $p\_2$ that produce a product $N=p\_1p\_2$ of $k\_N$ bits are selected (Step 120102);

ISSGEN1-3: Elements of QR(N), that are $a\_0$, $a\_1$ and $a\_2$, are selected at random (Step 120103);

ISSGEN1-4: $(p\_1,p\_2)$ is set into isk, the secret key of issuing device 100, and isk is written into issuing device storage 110 (Step 120104); and ISSGEN1-5: $(N,a\_0,a\_1,a\_2)$ is set into ipk, the public key of issuing device 100, and ipk is written into issuing device storage 110 and ipk is output (Step 120105).

From a safety viewpoint, it is preferred that both $(p\_1-1)/2$ and $(p\_2-1)/2$ at ISS1-1 are prime numbers. It is also preferred that the bit number of $p\_1$ and the bit number of $p\_2$ at ISS1-1 are approximately equal to each other.

[Disclosing Device Key Generating Means 220]

Figure 5:
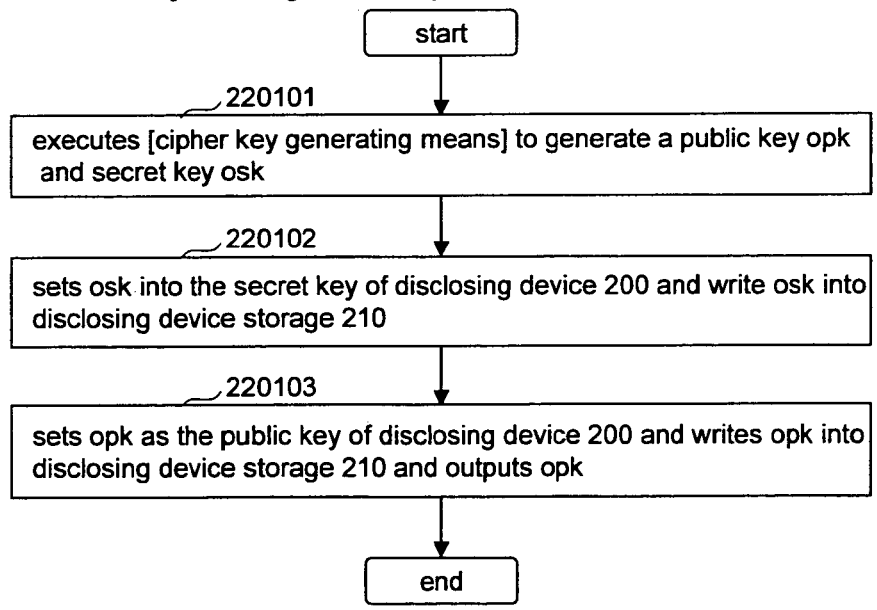
FIG. 5 is a flow chart showing a disclosing device key generating means of exemplary embodiment 1.

Disclosing device 200 executes OPNGEN1-1 . . . , OPNGEN1-3 as follows (FIG. 5).

OPNGEN1-1: [cipher key generating means] is executed to generate a public key opk and secret key osk (Step 220101);

OPNGEN1-2: osk is set into the secret key of disclosing device 200 and osk is written into disclosing device storage 210 (Step 220102); and OPNGEN1-3: opk is set as the public key of disclosing device 200 and opk is written into disclosing device storage 210 and opk is output (Step 220103).

[Revocation Manager Key Generating Means 320]

Figure 6:
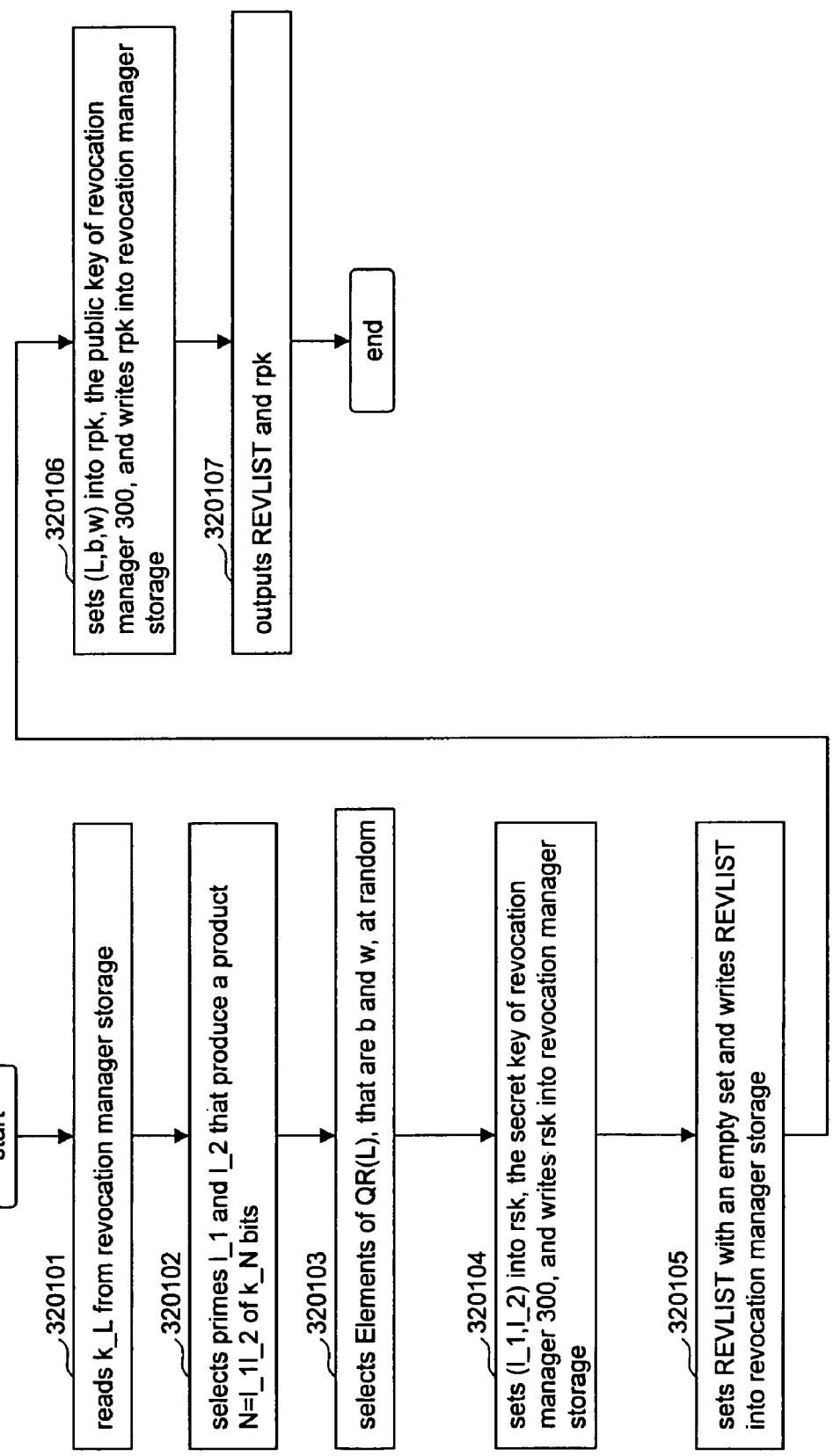
FIG. 6 is a flow chart showing a revocation manager key generating means of exemplary embodiment 1.

Revocation manager 300 executes REVGEN1-1 . . . , REVGEN1-7 as follows (FIG. 6).

REVGEN1-1: $k\_L$ is read from revocation manager storage 310 (Step 320101);

REVGEN1-2: Primes $l\_1$ and $l\_2$ that produce a product $N=l\_1l\_2$ of $k\_N$ bits are selected (Step 102);

REVGEN1-3: Elements of QR(L), that are b and w, are selected at random (Step 320103);

REVGEN1-4: $(l\_1,l\_2)$ is set into rsk, the secret key of revocation manager 300, and rsk is written into revocation manager storage 310 (Step 320104);

REVGEN1-5: REVLIST is set with an empty set and REVLIST is written into revocation manager storage 310 (Step 320105);

REVGEN1-6: (L,b,w) is set into rpk, the public key of revocation manager 300, and rpk is written into revocation manager storage 310 (Step 320106);

REVGEN1-7: REVLIST and rpk are output (Step 320107).

From a safety viewpoint, it is preferred that both $(l\_1-1)/2$ and $(l\_2-1)/2$ at REVGEN1-1 are prime numbers. It is also preferred that the bit number of $l\_1$ and the bit number of $l\_2$ at REVGEN1-1 are approximately equal to each other.

[Issuing and Joining Means]

Figure 7:
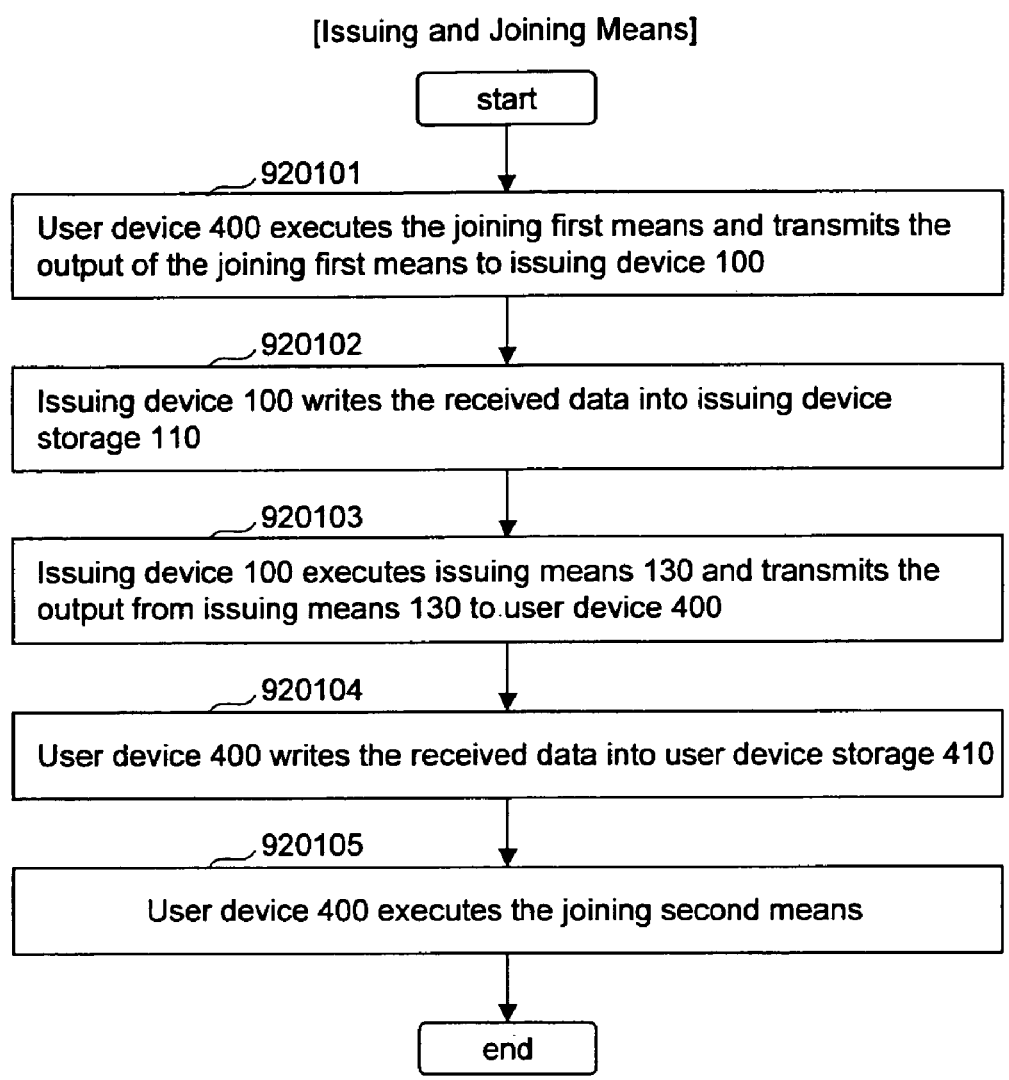
FIG. 7 is a flow chart showing an issuing and joining means of exemplary embodiment 1.

In the issuing and joining means, issuing device 100 and user device 400 execute issuing means 130 and joining means 420, respectively. Joining means 420 is comprised of a joining first means and joining second means. In the issuing and joining means, the following ISSJOIN1-1, . . . ISSJOIN1-5 are sequentially executed (FIG. 7).

ISSJOIN1-1: User device 400 executes the joining first means and transmits the output of the joining first means to issuing device 100 (Step 920101).

ISSJOIN1-2: Issuing device 100 writes the received data into issuing device storage 110 (Step 920102).

ISSJOIN1-3: Issuing device 100 executes issuing means 130 and transmits the output from issuing means 130 to user device 400 (Step 920103).

ISSJOIN1-4: User device 400 writes the received data into user device storage 410 (Step 920104).

ISSJOIN1-5: User device 400 executes the joining second means (Step 920105).

[Joining First Means]

Figure 8:
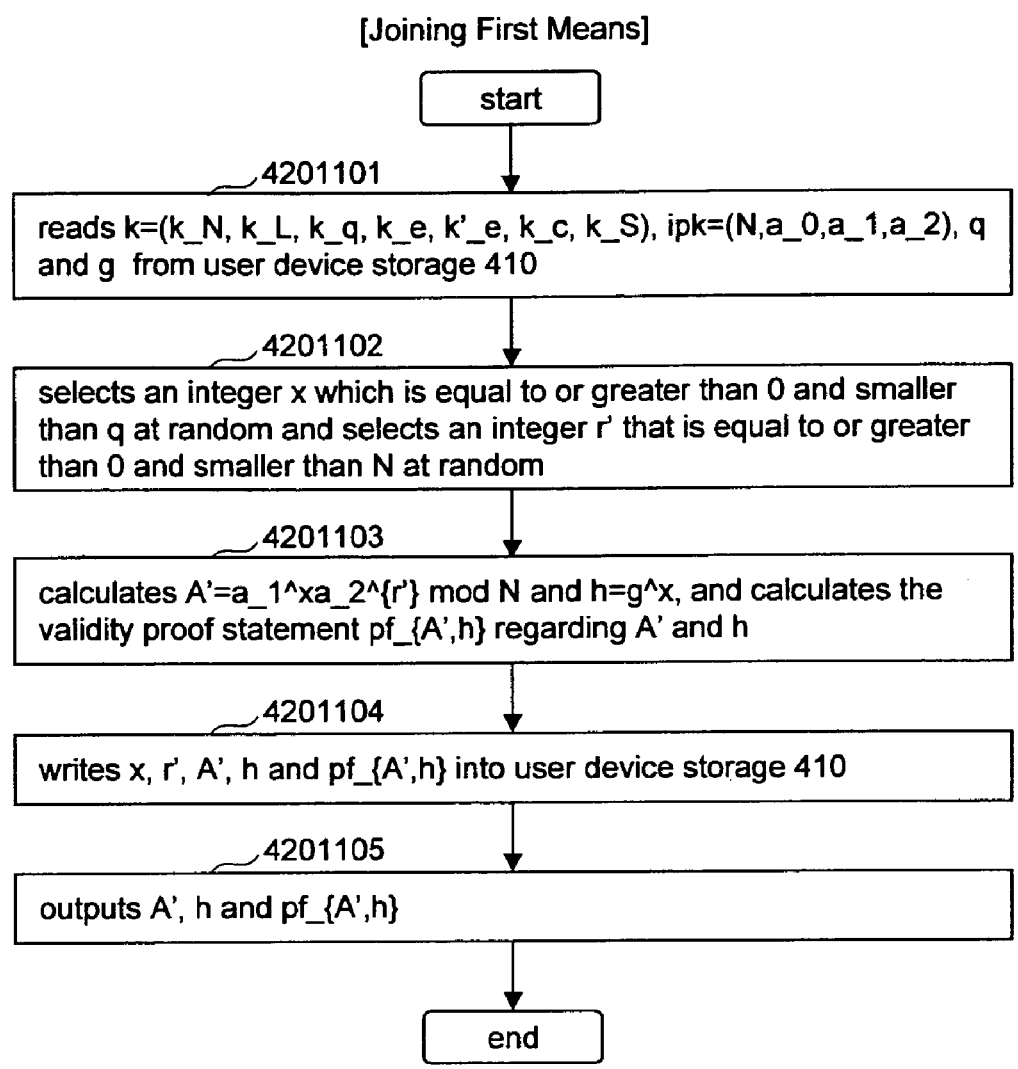
FIG. 8 is a flow chart showing a joining first means of exemplary embodiment 1.

User device 400 sequentially executes the following JOIN1-1-1, . . . JOIN1-1-5 (FIG. 8).

JOIN1-1-1: $k=(k\_N, k\_L, k\_q, k\_e, k'\_e, k\_c, k\_S)$, $ipk=(N, a\_0, a\_1, a\_2)$, q and g are read from user device storage 410 (Step 4201101);

JOIN1-1-2: An integer x which is equal to or greater than 0 and smaller than q is selected at random and an integer r' that is equal to or greater than 0 and smaller than N is selected at random (Step 4201102);

JOIN1-1-3: $A'=a\_1^x a\_2^{r'} \mod N$ and $h=g^x$ are calculated, and the validity proof statement $pf\_\{A',h\}$ regarding A' and h is calculated (Step 4201103);

JOIN1-1-4: x, r', A', h and $pf\_\{A',h\}$ are written into user device storage 410 (Step 4201104); and JOIN1-1-5: A', h and $pf\_\{A',h\}$ are output (Step 4201105).

Here, the detail of the method of calculating $pf\_\{A',h\}$ is disclosed in [document 1], so that description is omitted herein.

[Issuing Means 130]

Figure 9:
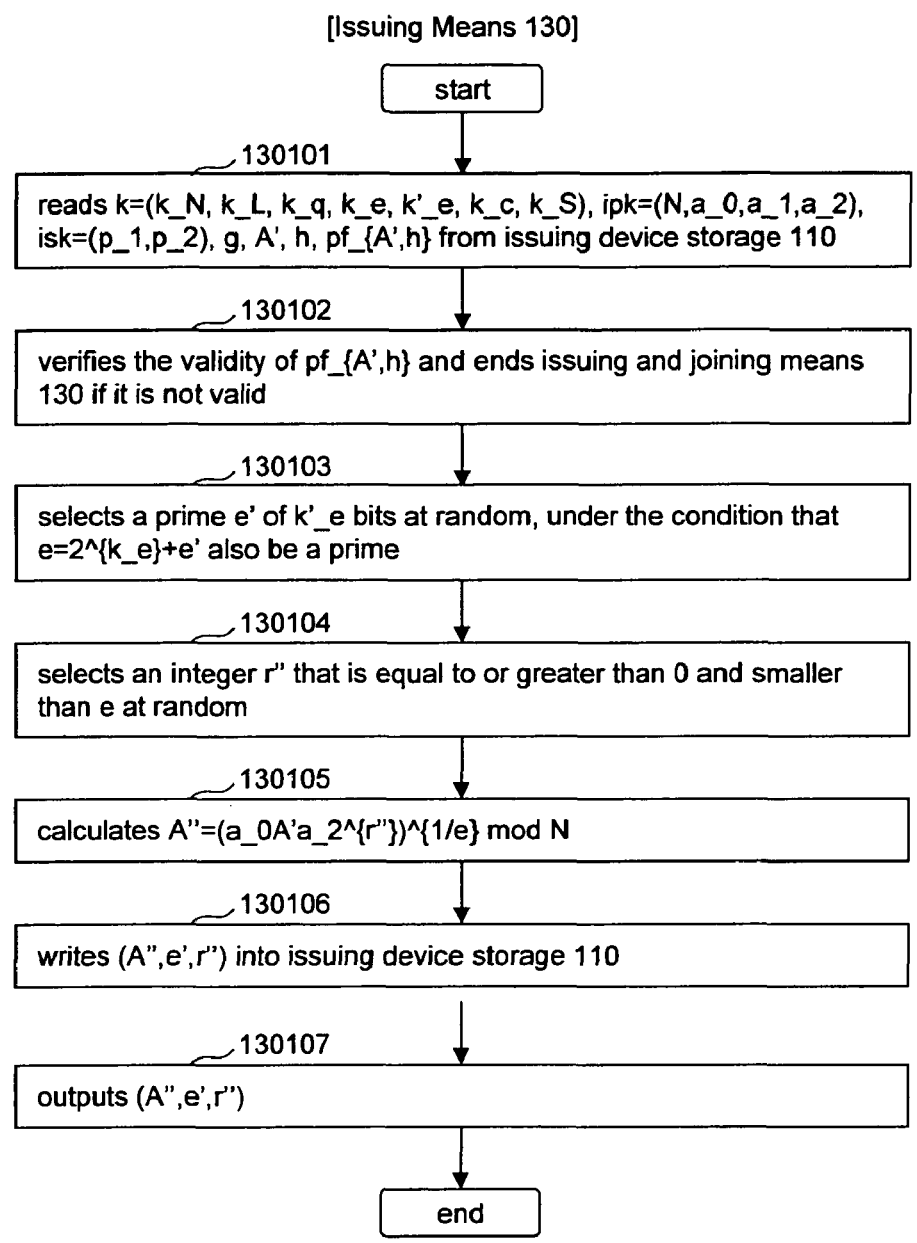
FIG. 9 is a flow chart showing an issuing means of exemplary embodiment 1.

Issuing device 100 sequentially executes ISSUE1-1, . . . ISSUE1-7 as follows (FIG. 9).

ISSUE1-1: $k=(k\_N, k\_L, k\_q, k\_e, k'\_e, k\_C, k\_S)$, $ipk=(N, a\_0, a\_1, a\_2)$, $isk=(p\_1,p\_2)$, g, A', h, $pf\_\{A',h\}$ are read from issuing device storage 110 (Step 130101);

ISSUE1-2: The validity of $pf\_\{A',h\}$ is verified and issuing and joining means 130 is ended if it is not valid (Step 130102);

ISSUE1-3: A prime e' of $k'\_e$ bits is selected at random, under the condition that $e=2^{\{k\_e\}}+e'$ also be a prime (Step 130103);

ISSUE1-4: An integer r" that is equal to or greater than 0 and smaller than e is selected at random (Step 130104);

ISSUE1-5: $A''=(a\_0 A' a\_2^{\{r''\}})^{\{1/e\}} \mod N$ is calculated (Step 130105);
ISSUE1-6: $(A'',e',r'')$ is written into issuing device storage 110 (Step 130106); and
ISSUE1-7: $(A'',e',r'')$ is output (Step 130107).
Here, the detail of the method of verifying pf_{A',h} is disclosed in [document 1], so that description is omitted herein.

[Joining Second Means]

Figure 10:
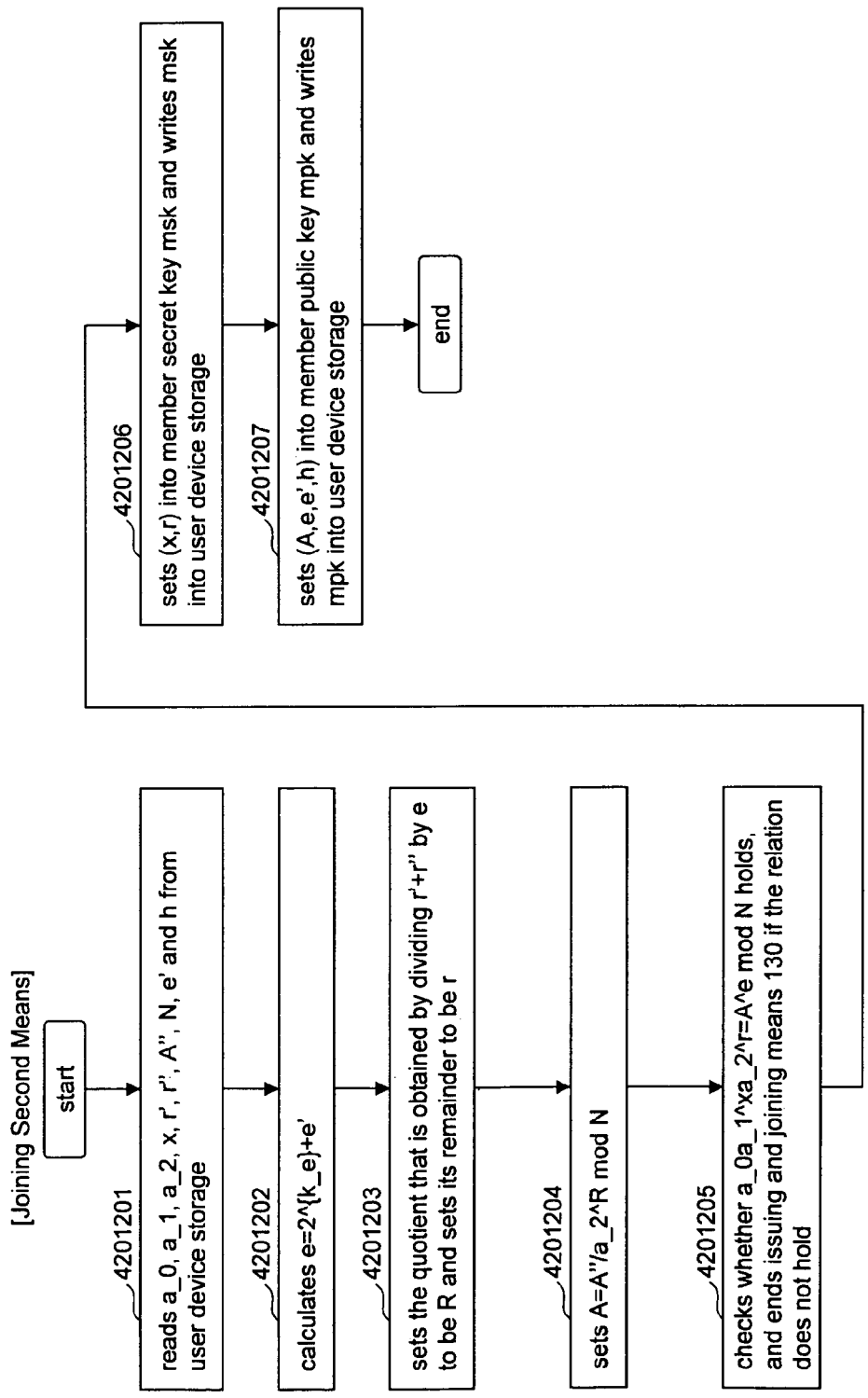
FIG. 10 is a flow chart showing a joining second means of exemplary embodiment 1.

User device 400 sequentially executes the following JOIN1-2-1, ... JOIN1-2-7 (FIG. 10).
JOIN1-2-1: $a\_0, a\_1, a\_2, x, r', r'', A'', N, e'$ and $h$ are read from user device storage 410 (Step 4201201);
JOIN1-2-2: $e=2^{\{k\_e\}}+e'$ is calculated (Step 4201202);
JOIN1-2-3: The quotient that is obtained by dividing $r'+r''$ by $e$ is set to be R and its remainder is set to be r (Step 4201203);
JOIN1-2-4: $A=A''/a\_2^R \mod N$ is set (Step 4201204);
JOIN1-2-5: It is checked whether $a\_0 a\_1^x a\_2^r = A^e \mod N$ holds, and issuing and joining means 130 is ended if the relation does not hold (Step 4201205); r
JOIN1-2-6: $(x,r)$ is set into member secret key msk and msk is written into user device storage 410 (Step 4201206); and
JOIN1-2-7: $(A,e,e',h)$ is set into member public key mpk and mpk is written into user device storage 410 (Step 4201207).

[Registration Means 330]

Figure 11:
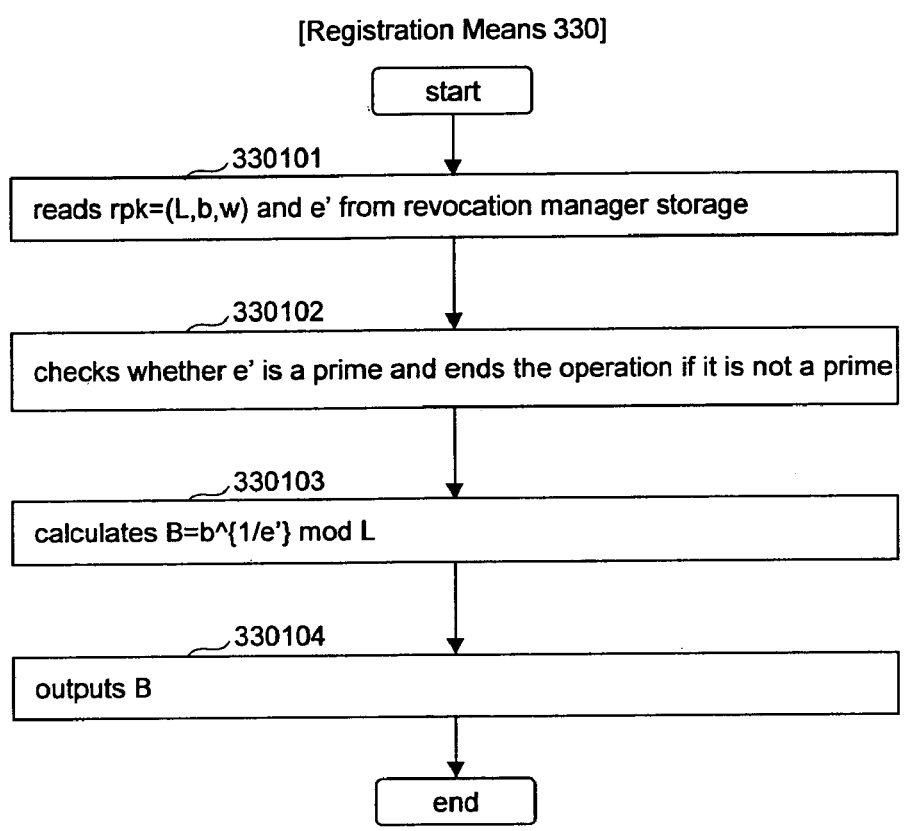
FIG. 11 is a flow chart showing a registration means of exemplary embodiment 1.

Revocation manager 300 sequential executes ADD1-1, ..., ADD1-4 as follows (FIG. 11).
ADD1-1: $rpk=(L,b,w)$ and $e'$ are read from revocation manager storage 310 (Step 330101);
ADD1-2: It is checked whether $e'$ is a prime and the operation is ended if it is not a prime (Step 330102);
ADD1-3: $B=b^{\{1/e'\}} \mod L$ is calculated (Step 330103); and
ADD1-4: B is output (Step 330104).

[Revocation Means 340]

Figure 12:
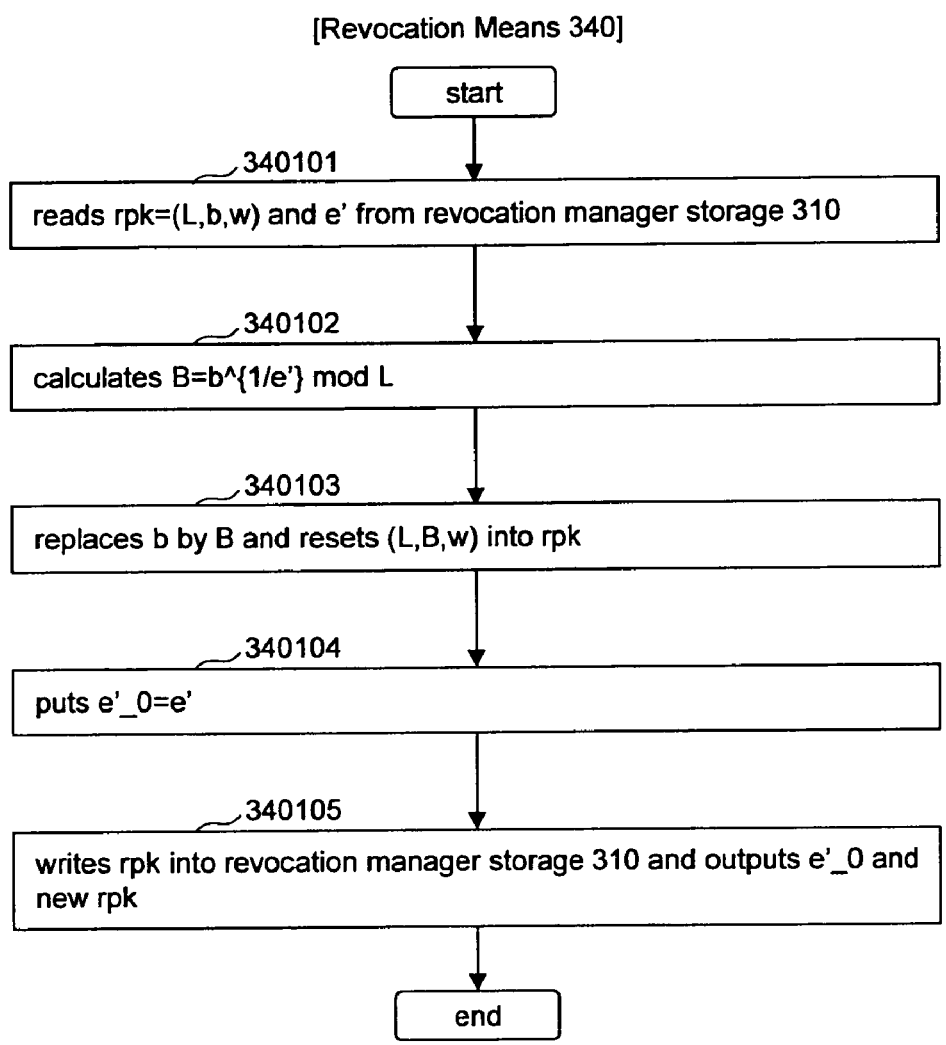
FIG. 12 is a flow chart showing a revocation means of exemplary embodiment 1.

Revocation manager 300 executes REV1-1, ..., REV1-4, sequentially, using $e'$ of the user device that is wanted to leave from the group (FIG. 12).
REV1-1: $rpk=(L,b,w)$ and $e'$ are read from revocation manager storage 310 (Step 340101);
REV1-2: $B=b^{\{1/e'\}} \mod L$ is calculated (Step 340102);
REV1-3: b is replaced by B and (L,B,w) is reset into rpk (Step 340103);
REV1-4: $e'\_0=e'$ is put (Step 340104); and
REV1-5: rpk is written into revocation manager storage 310 and $e'\_0$ and new rpk are output (Step 340105).

[Key Updating Means 430]

Figure 13:
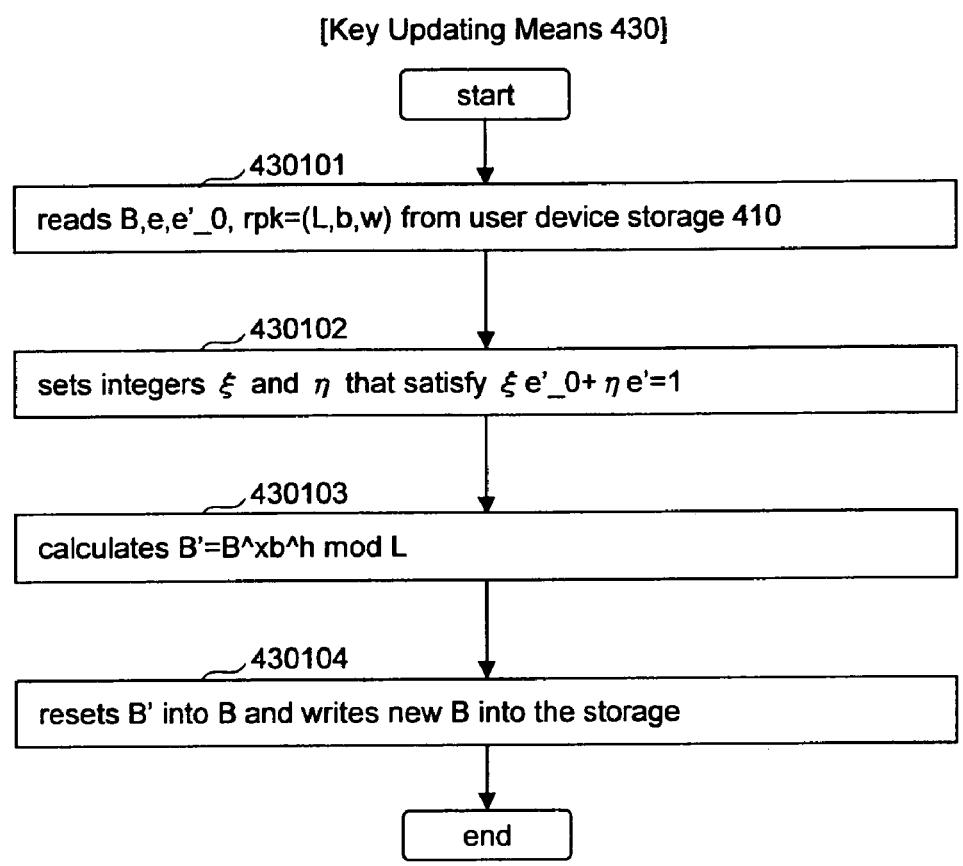
FIG. 13 is a flow chart showing a key updating means of exemplary embodiment 1.

User device 400 sequentially executes UPDATE1-1, ... UPDATE1-4 as follows (FIG. 13).
UPDATE1-1: $B,e,e'\_0, rpk=(L,b,w)$ are read from user device storage 410 (Step 430101);
UPDATE1-2: Integers $\xi$ and $\eta$ that satisfy $\xi e'\_0 + \eta e' = 1$ are set (Step 430102);
UPDATE1-3: $B'=B^\xi b^\eta \mod L$ is calculated (Step 430103); and
UPDATE1-4: B' is reset into B and new B is written into the storage (Step 430104).
At UPDATE1-2, it is possible to find $\xi$ and $\eta$ by performing the extended Euclidean algorithm, for example.

[Signature Means 440]

Figure 14:
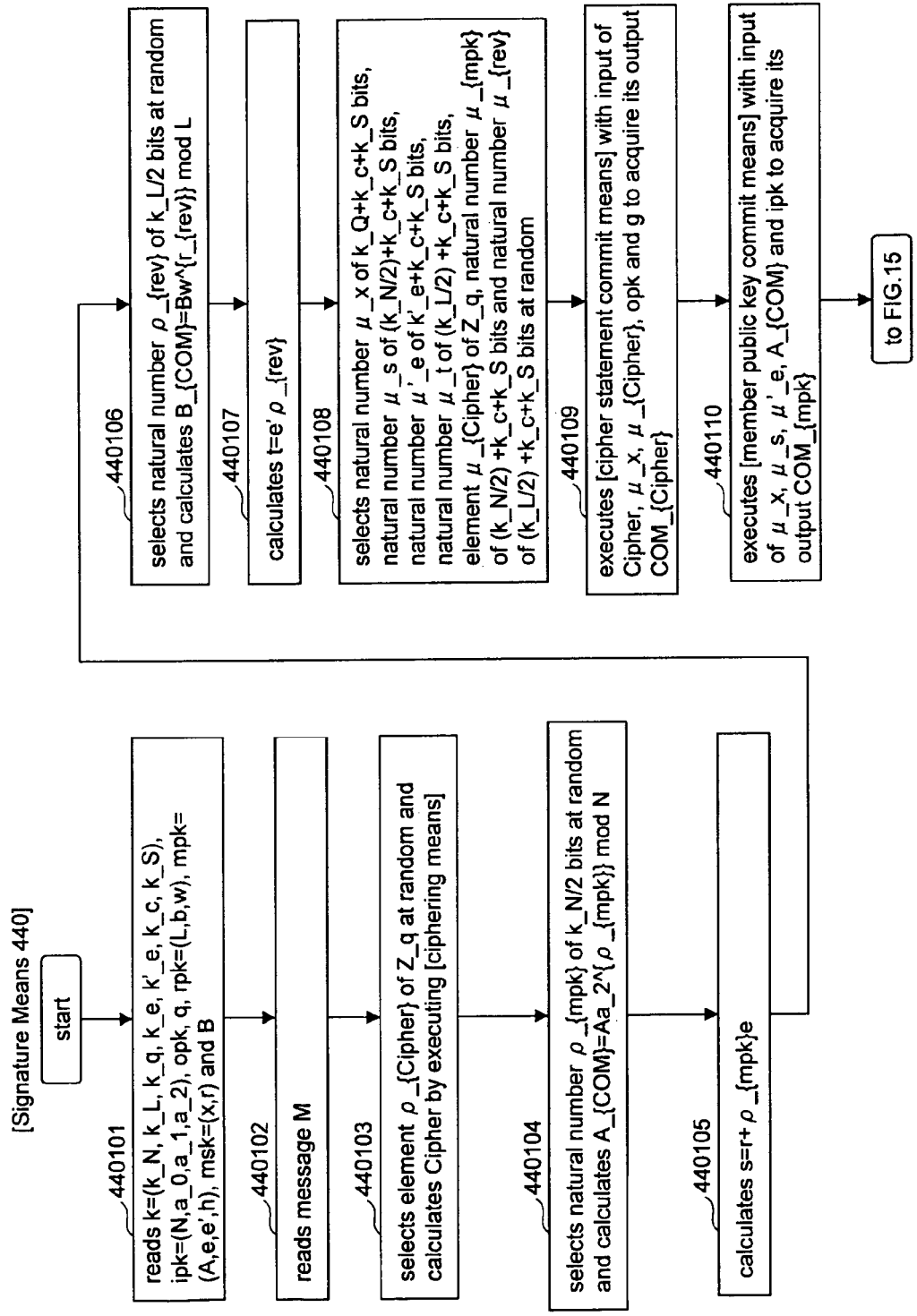
FIG. 14 is a flow chart showing a signature means of exemplary embodiment 1.
Figure 15:
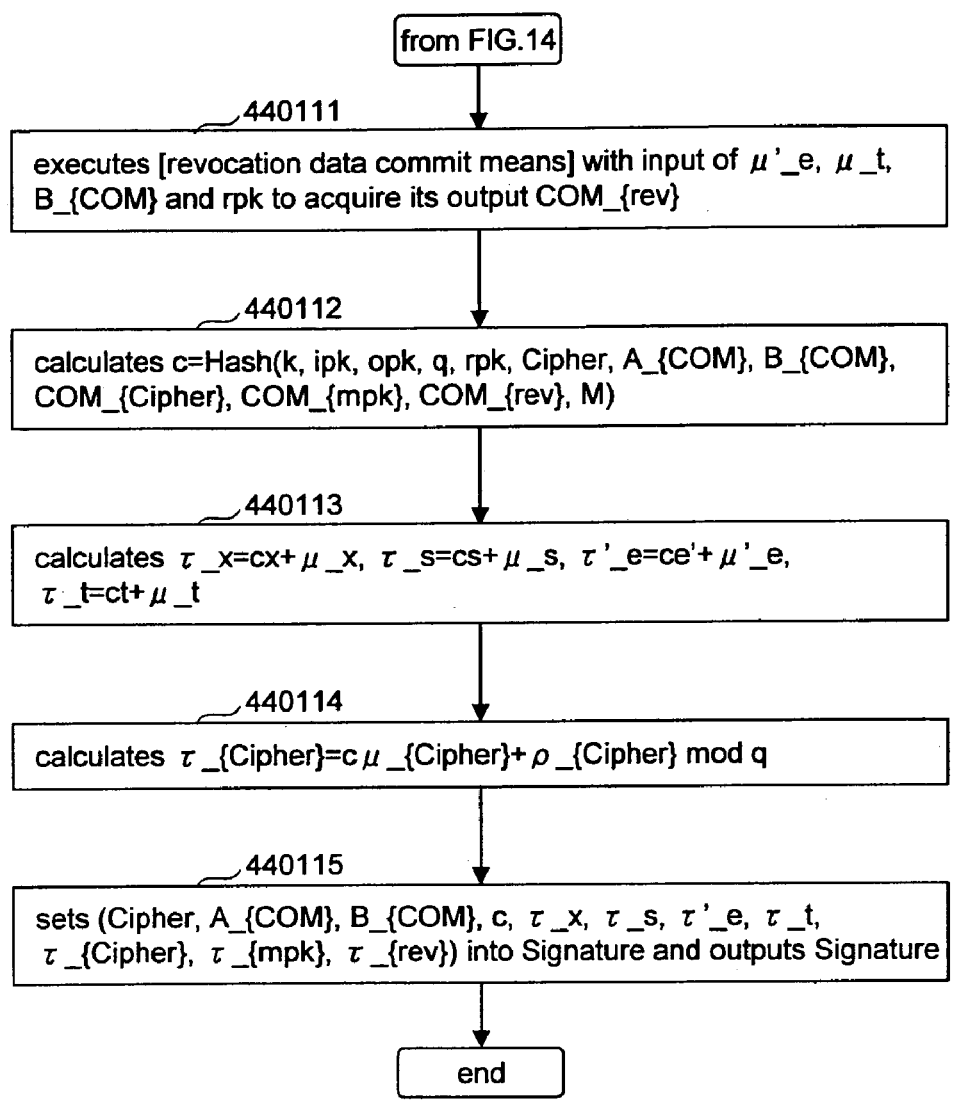
FIG. 15 is a flow chart showing a signature means of exemplary embodiment 1.

User device 400 execute SIGN1-1, ..., SIGN1-15 as follows (FIGS. 14 and 15).
SIGN1-1: $k=(k\_N, k\_L, k\_q, k\_e, k'\_e, k\_c, k\_S)$, $ipk=(N, a\_0, a\_1, a\_2)$, opk, q, $rpk=(L,b,w)$, $mpk=(A,e,e',h)$, $msk=(x,r)$ and B are read from user device storage 410 (Step 440101);
SIGN1-2: Message M is read (Step 440102);
SIGN1-3: Element $\rho\_\{Cipher\}$ of $Z\_q$ is selected at random and Cipher is calculated by executing [ciphering means] (Step 440103);
SIGN1-4: Natural number $\rho\_\{mpk\}$ of $k\_N/2$ bits is selected at random and $A\_\{COM\}=Aa\_2^{\{\rho\_\{mpk\}\}} \mod N$ is calculated (Step 440104);
SIGN1-5: $s=r+\rho\_\{mpk\}e$ is calculated (Step 440105);
SIGN1-6: Natural number $\rho\_\{rev\}$ of $k\_L/2$ bits is selected at random and $B\_\{COM\}=Bw^{\{r\_\{rev\}\}} \mod L$ is calculated (Step 440106);
SIGN1-7: $t=e'\rho\_\{rev\}$ is calculated (Step 440107);
SIGN1-8: Natural number $\mu\_x$ of $k\_Q+k\_c+k\_S$ bits, natural number $\mu\_s$ of $(k\_N/2)+k\_c+k\_S$ bits, natural number $\mu'\_e$ of $k'\_e+k\_c+k\_S$ bits, natural number $\mu\_t$ of $(k\_L/2)+k\_c+k\_S$ bits, element $\mu\_\{Cipher\}$ of $Z\_q$, natural number $\mu\_\{mpk\}$ of $(k\_N/2)+k\_c+k\_S$ bits and natural number $\mu\_\{rev\}$ of $(k\_L/2)+k\_c+k\_S$ bits are selected at random (Step 440108);
SIGN1-9: [cipher statement commit means] is executed with input of Cipher, $\mu\_x, \mu\_\{Cipher\}$, opk and g to acquire its output $COM\_\{Cipher\}$ (Step 440109);
SIGN1-10: [member public key commit means] is executed with input of $\mu\_x \mu\_s, \mu'\_e, A\{COM\}$ and ipk to acquire its output $COM\_\{mpk\}$ (Step 440110);
SIGN1-11: [revocation data commit means] is executed with input of $\mu'\_e, \mu\_t, B\_\{COM\}$ and rpk to acquire its output $COM\_\{rev\}$ (Step 440111);
SIGN1-12: $c=Hash(k, ipk, opk, q, rpk, Cipher, A\_\{COM\}, B\_\{COM\}, COM\_\{Cipher\}, COM\_\{mpk\}, COM\_\{rev\}, M)$ is calculated (Step 440112);
SIGN1-13: $\tau\_x=cx+\mu\_x, \tau\_s=cs+\mu\_s, \tau'\_e=ce'+\mu'\_e, \tau\_t=ct+\mu\_t$ are calculated (Step 440113);
SIGN1-14: $\tau\_\{Cipher\}=c\mu\_\{Cipher\}+\rho\_\{Cipher\} \mod q$ is calculated (Step 440114); and
SIGN1-15: $(Cipher, A\_\{COM\}, B\_\{COM\}, c, \tau\_x, \tau\_s, \tau'\_e, \tau\_t, \tau\{Cipher\}, \tau\_\{mpk\}, \tau\_\{rev\})$ is set into Signature and Signature is output (Step 440115).

[Cipher Statement Commit Means]

Figure 16:
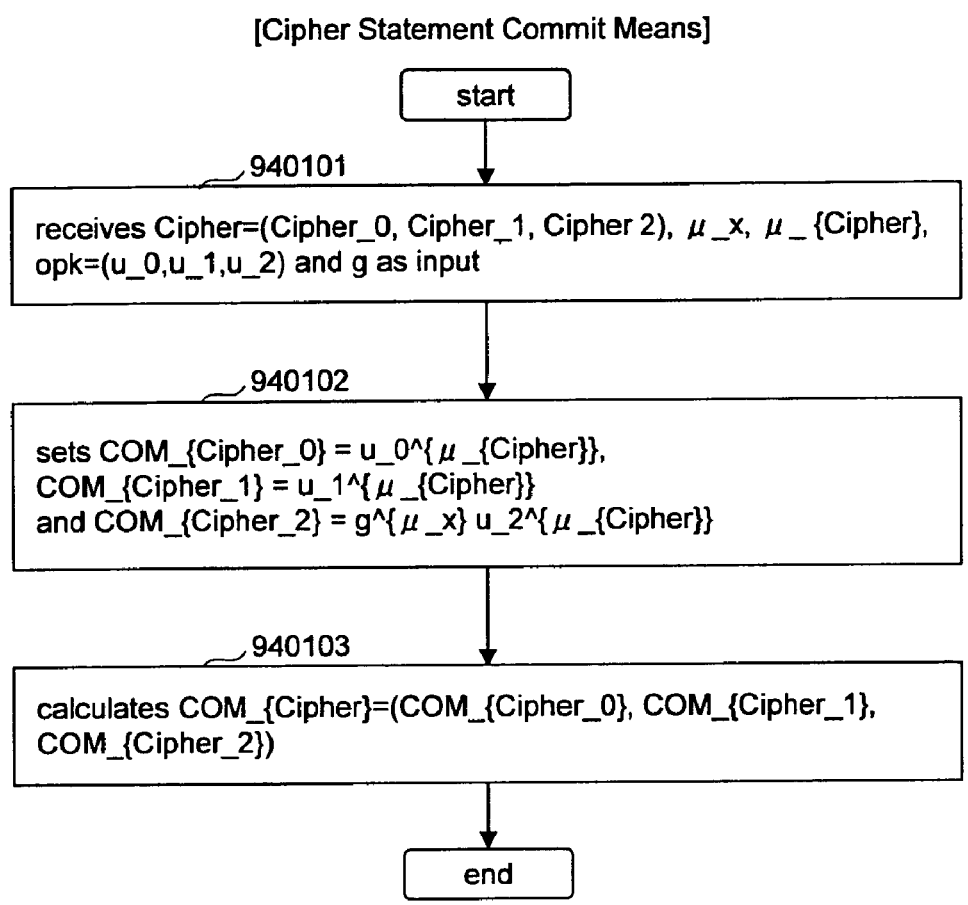
FIG. 16 is a flow chart showing a cipher statement commit means of exemplary embodiment 1.

User device 400 executes COMPCIPHER1-1, ..., COMPCIPHER1-3 as follows (FIG. 16).
COMPCIPHER1-1: $Cipher=(Cipher\_0, Cipher\_1, Cipher\_2), \mu\_x, \mu\_\{Cipher\}, opk=(u\_0,u\_1,u\_2)$ and g are received as input (Step 940101);
COMPCIPHER1-2: $COM\_\{Cipher\_0\}=u\_0^{\{\mu\_\{Cipher\}\}}, COM\_\{Cipher\_1\}=u\_1^{\{\mu\_\{Cipher\}\}}$ and $COM\_\{Cipher\_2\}=g^{\{\mu\_x\}} u\_2^{\{u\_\{Cipher\}\}}$ are set (Step 940102); and
COMPCIPHER1-3: $COM\_\{Cipher\}=(COM\_\{Cipher\_0\}, COM\_\{Cipher\_1\}, COM\_\{Cipher\_2\})$ is calculated (Step 940103).

[Member Public Key Commit Means]

Figure 17:
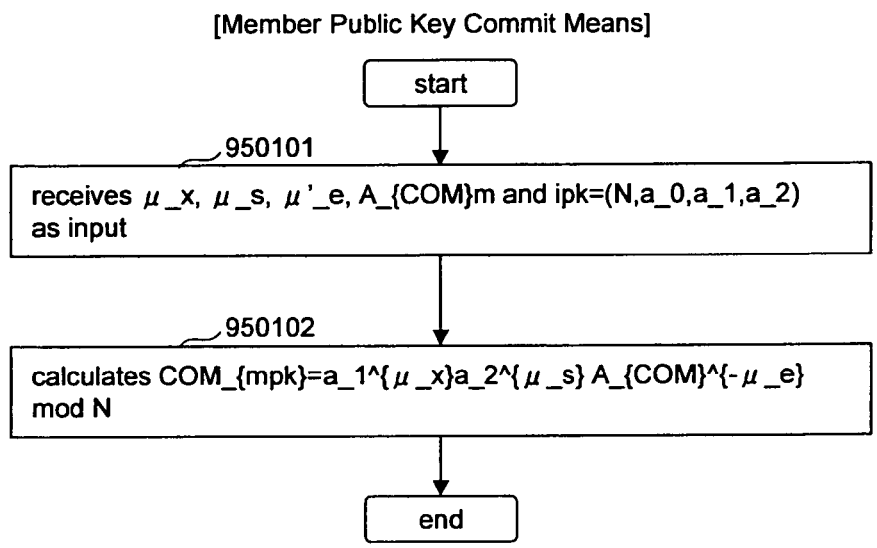
FIG. 17 is a flow chart showing a member public key commit means of exemplary embodiment 1.

User device 400 executes the following COMMPK1-1 and COMMPK1-2 (FIG. 17).
COMMPK1-1: $\mu\_x, \mu\_s, \mu'\_e, A\_\{COM\}m$ and $ipk=(N,a\_0, a\_1,a\_2)$ are received as input (Step 950101); and
COMMPK1-2: $COM\_\{mpk\}=a\_1^{\{\mu\_x\}} a\_2^{\{\mu\_s\}} A\_\{COM\}^{\{-\mu\_e\}} \mod N$ is calculated (Step 950102).

[Revocation Data Commit Means]

Figure 18:
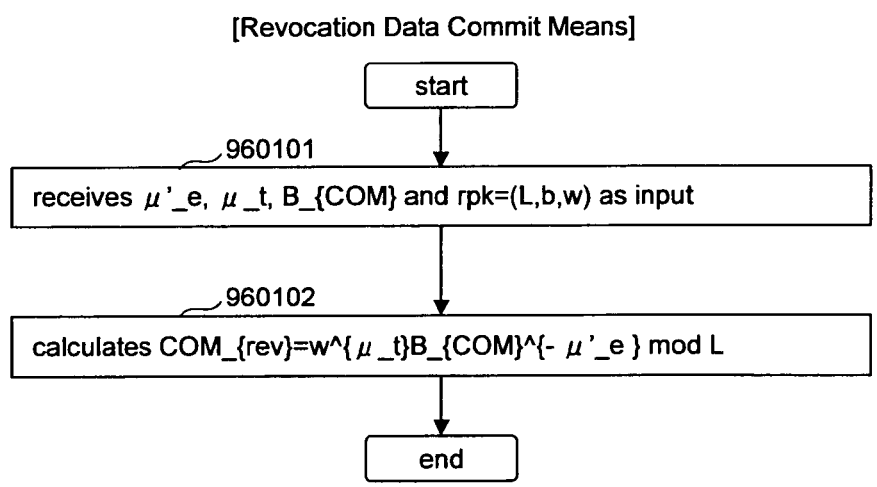
FIG. 18 is a flow chart showing a revocation data commit means of exemplary embodiment 1.
Figure 19:
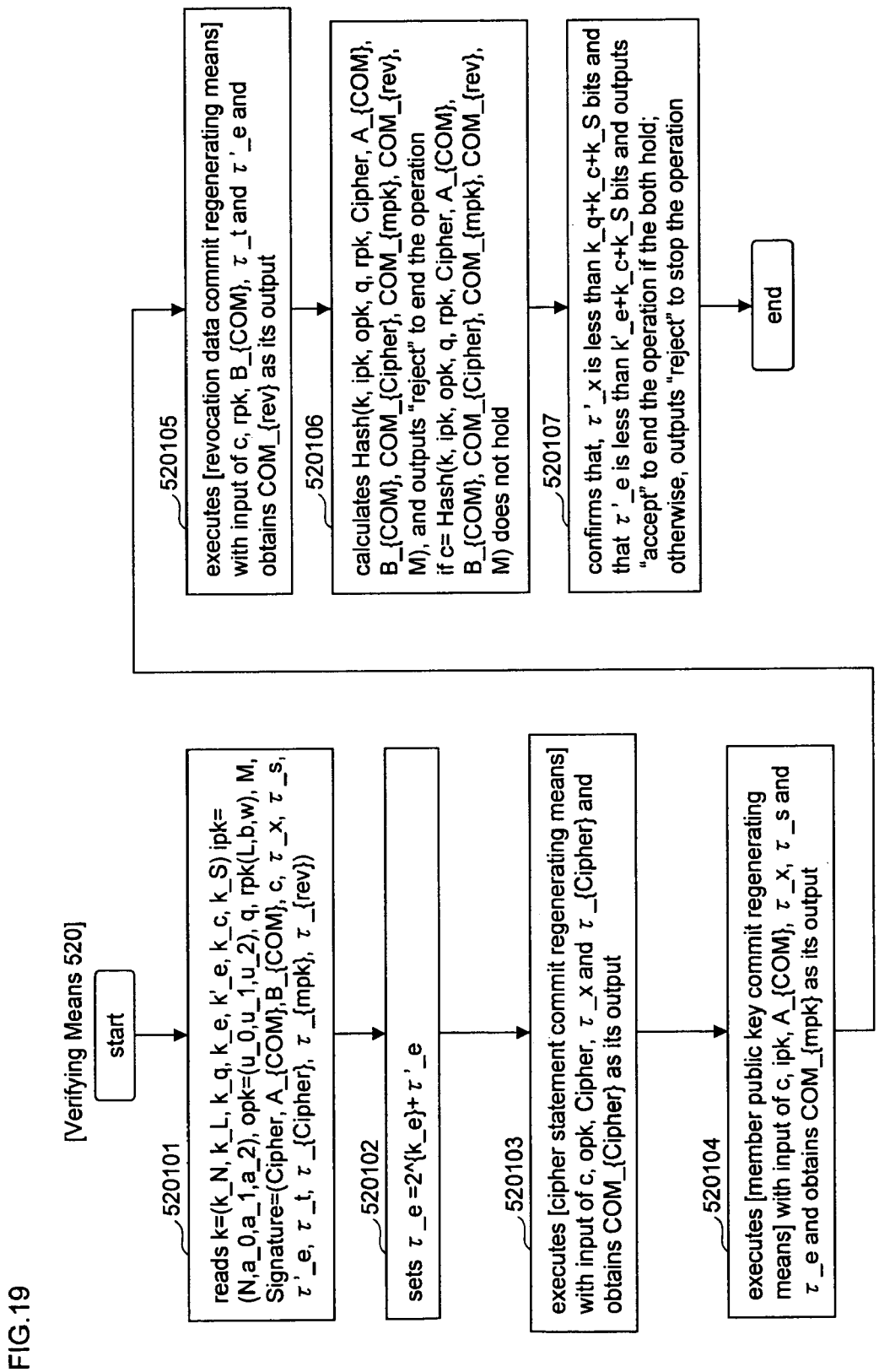
FIG. 19 is a flow chart showing a verifying means of exemplary embodiment 1.

User device 400 executes the following COMREV1-1 and COMREV1-2 (FIG. 18).
COMREV1-1: $u'\_e, \mu\_t, B\_\{COM\}$ and $rpk=(L,b,w)$ are received as input (Step 960101); and
COMREV1-2: $COM\_\{rev\}=w^{\{\mu\_t\}} B\_\{COM\}^{\{-\mu'\_e\}} \mod L$ is calculated (Step 960102).

[Verifying Means 520]

VER1-1: $k=(k\_N, k\_L, k\_q, k\_e, k'\_e, k\_c, k\_S)$ $ipk=(N,a\_0, a\_1,a\_2)$, $opk=(u\_0,u\_1,u\_2)$, q, $rpk(L,b,w)$, M, Signature=(Cipher, A_{COM}, B_{COM}, c, τ_x, τ_s, τ'_e, τ_t, τ_{Cipher}, τ_{mpk}, τ_{rev}) are read from verifying device storage 510 (Step 520101);

VER1-2: $τ\_e=2^{\{k\_e\}}+τ'\_e$ is set (Step 520102);

VER1-3: [cipher statement commit regenerating means] is executed with input of c, opk, Cipher, τ_x and τ_Cipher) and COM_{Cipher} is obtained as its output (Step 520103);

VER1-4: [member public key commit regenerating means] is executed with input of c, ipk, A_{COM}, τ_x, τ_s and τ_e and COM_{mpk} is obtained as its output (Step 520104);

VER1-5: [revocation data commit regenerating means] is executed with input of c, rpk, B_{COM}, τ_t and τ'_e and COM_{rev} is obtained as its output (Step 520105);

VER1-6: Hash(k, ipk, opk, q, rpk, Cipher, A_{COM}, B_{COM}, COM_{Cipher}, COM_{mpk}, COM_{rev}, M) is calculated, and "reject" is output to end the operation if c=Hash(k, ipk, opk, q, rpk, Cipher, A_{COM}, B_{COM}, COM_{Cipher}, COM_{mpk}, COM_{rev}, M) does not hold (Step 520106);

VER1-7: It is confirmed that, τ'_x is less than k_q+k_c+k_S bits and that τ'_e is less than k'_e+k_c+k_S bits and "accept" is output to end the operation if the both hold; otherwise, "reject" is output to stop the operation (Step 520107).

[Cipher Statement Commit Regenerating Means]

Figure 20:
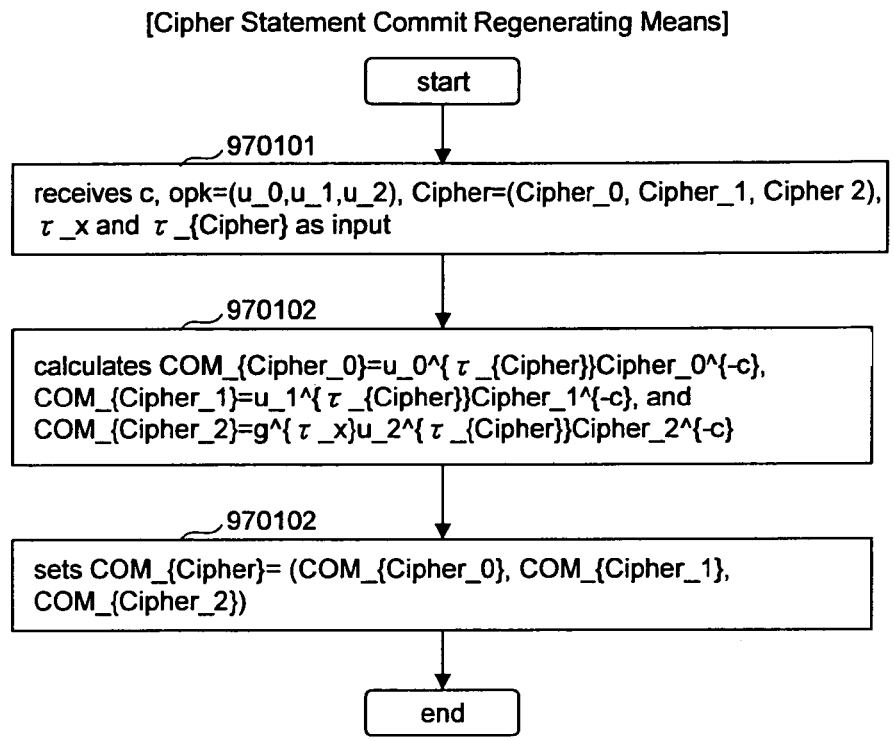
FIG. 20 is a flow chart showing a cipher statement commit regenerating means of exemplary embodiment 1.

Verifying device 500 executes RECCOMCIPHER1-1, . . . , RECCOMCHIPHER1-3 as follows (FIG. 20).

RECCOMCIPHER1-1: c, opk=(u_0,u_1,u_2), Cipher=(Cipher_0, Cipher_1, Cipher_2), τ_x and τ_{Cipher} are received as input (Step 970101);

RECCOMCIPHER1-2:
COM_{Cipher_0}=u_0^{τ_{Cipher}}Cipher_0^{-c},
COM_{Cipher_1}=u_1^{τ_{Cipher}}Cipher_1^{c}, and
COM_{Cipher_2}=g^{τ_x}u_2^{τ_{Cipher}}Cipher_2^{-c}
are calculated (Step 940102); and RECCOMCIPHER1-3: COM_{Cipher}= (COM_{Cipher_0}, COM_{Cipher_1}, COM_{Cipher_2}) is set (Step 970103).

[Member Public Key Commit Regenerating Means]

Figure 21:
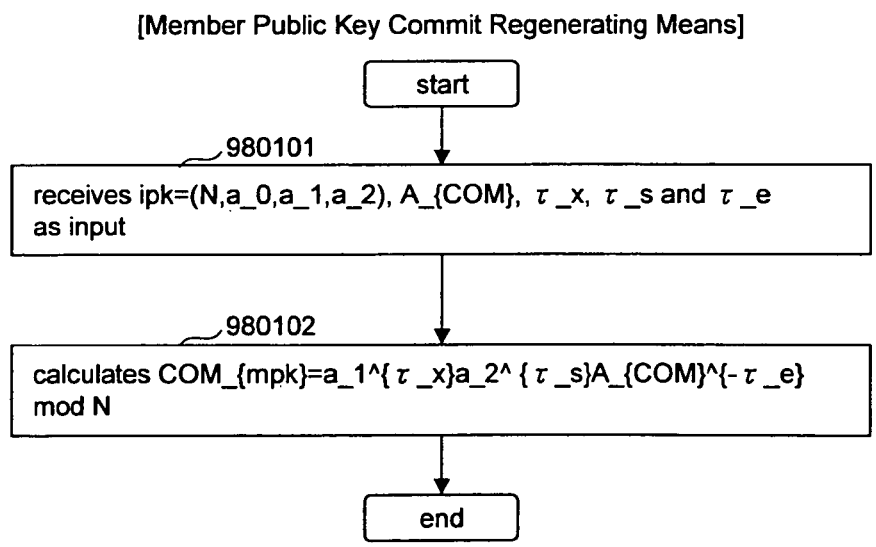
FIG. 21 is a flow chart showing member public key commit regenerating means of exemplary embodiment 1.

Verifying device 500 executes RECCOMMPK1-1 and RECCOMMPK1-2 as follows (FIG. 21).

RECCOMMPK1-1: ipk=(N,a_0,a_1,a_2), A_{COM}, τ_x, τ_s and τ_e are received as input (Step 980101); and RECCOMMPK1-2:
COM_{mpk}=a_1^{τ_x}a_2^{s}A{COM}^{-τ_e} mod N is calculated (Step 980102).

[Revocation Data Commit Regenerating Means]

Figure 22:
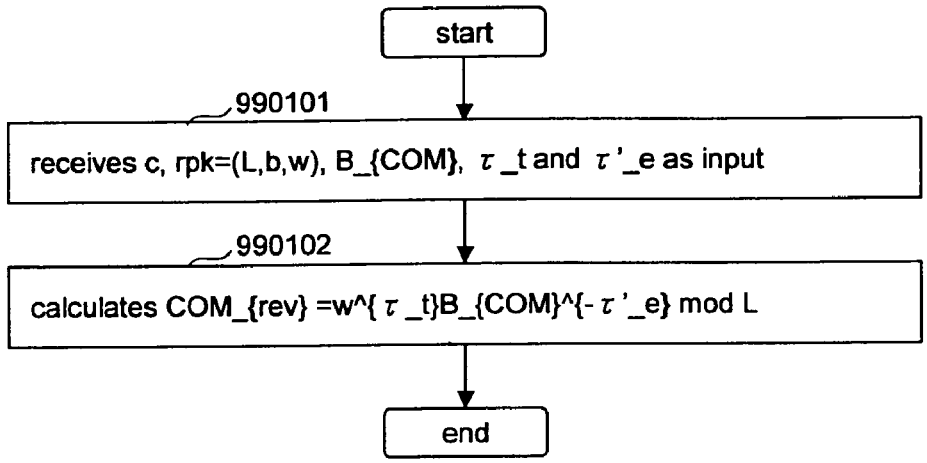
FIG. 22 is a flow chart showing a revocation data commit regenerating means of exemplary embodiment 1.

Verifying device 500 executes RECCOMREV1-1 and RECCOMREV1-2 as follows (FIG. 22).

RECCOMREV1-1: c, rpk=(L,b,w), B_{COM}, τ_t and τ'_e are received as input (Step 990101); and RECCOMREV1-2: COM_{rev}=w^A{τ_t}B_{COM}^{-τ'_e} mod L is calculated (Step 990102).

[Disclosing Means 230]

Figure 23:
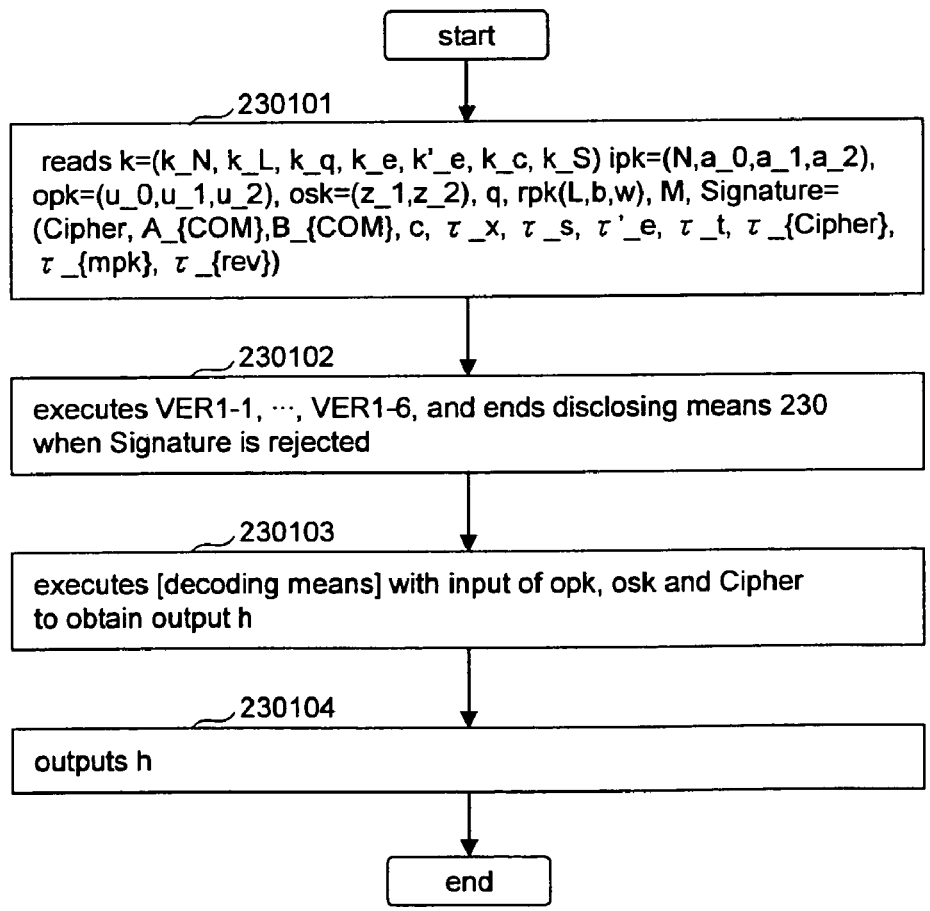
FIG. 23 is a flow chart showing a disclosing means of exemplary embodiment 1.

Disclosing device 200 executes OPN1-1, . . . , OPN1-4 (FIG. 23).

OPN1-1: k=(k_N, k_L, k_q, k_e, k'_e, k_c, k_S) ipk=(N,a_0, a_1,a_2), opk=(u_0,u_1,u_2), osk=(z_1,z_2), q, rpk(L,b, w), M, Signature=(Cipher, A_{COM},B_{COM}, c, τ_x, τ_s, τ'_e, τ_t, τ_{Cipher}, τ_{mpk}, τ_{rev}) are read from disclosing device storage 210 (Step 230101);

OPN1-2: VER1-1, . . . , VER1-6 are executed, and disclosing means 230 is ended when Signature is rejected (Step 230102);

OPN1-3: [decoding means] is executed with input of opk, osk and Cipher to obtain output h (Step 230103); and OPN1-4: h is output (Step 230104).

[Cipher Key Generating Means]

Figure 24:
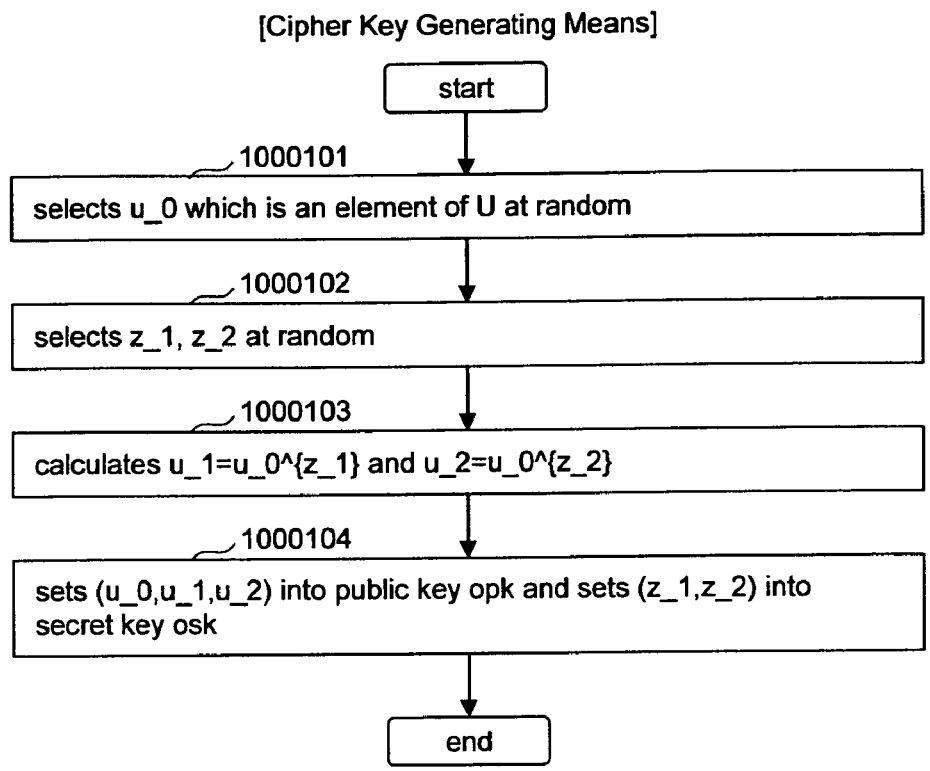
FIG. 24 is a flow chart showing a cipher key generating means of exemplary embodiment 1.

Disclosing device 200 executes EKEYGEN1-1, . . . , EKEYGEN1-4 as follows (FIG. 24).

EKEYGEN1-1: u_0 which is an element of U is selected at random (Step 1000101);

EKEYGEN1-2: z_1, z_2 are selected at random (Step 1000102);

EKEYGEN1-3: $u\_1=u\_0^{\{z\_1\}}$ and $u\_2=u\_0^{\{z\_2\}}$ are calculated (Step 1000103); and EKEYGEN1-4: (u_0,u_1,u_2) is set into public key opk and (z_1,z_2) is set into secret key osk (Step 1000104).

[Ciphering Means]

Figure 25:
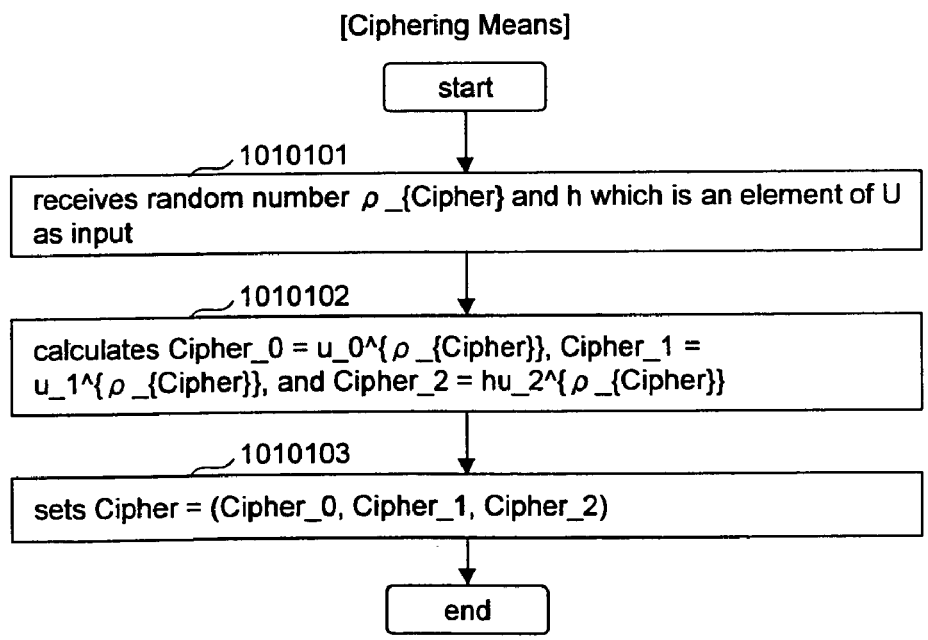
FIG. 25 is a flow chart showing a ciphering means of exemplary embodiment 1.

User device 400 executes ENC1-1, . . . ENC1-3 as follows (FIG. 25).

ENC1-1: random number ρ_{Cipher} and h which is an element of U are received as input (Step 1010101);

ENC1-2: Cipher_0=u_0^{ρ_{Cipher}}, Cipher_1=u_1^{ρ_{Cipher}}, and Cipher_2=hu_2^{ρ_{Cipher}} are calculated (Step 1010102);

ENC1-3: Cipher=(Cipher_0, Cipher_1, Cipher_2) is set (Step 1010103).

[Decoding Means]

Figure 26:
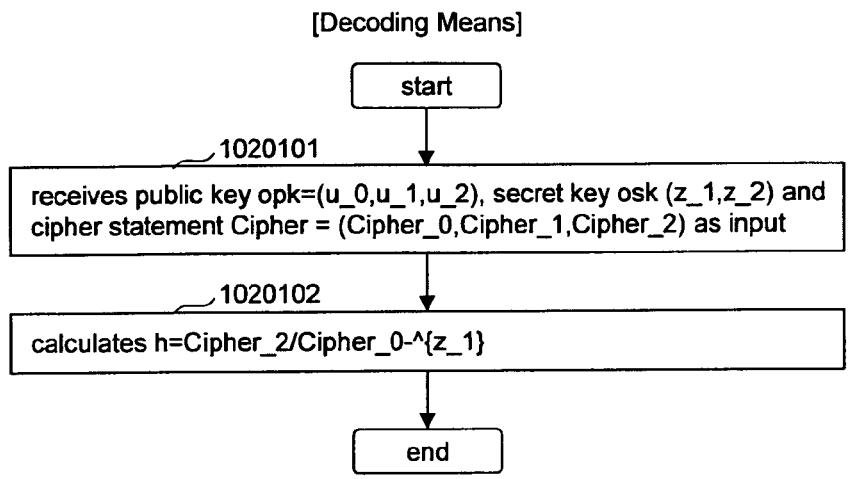
FIG. 26 is a flow chart showing a decoding means of exemplary embodiment 1.

Disclosing device 200 executes DEC1-1, . . . , DEC1-2 as follows (FIG. 26).

DEC1-1: public key opk=(u_0,u_1,u_2), secret key osk (z_1, z_2) and cipher statement Cipher=(Cipher_0,Cipher_1,Cipher_2) are received as input (Step 1020101); and DEC1-2: $h=Cipher\_2/Cipher\_0^{-\{z\_1\}}$ is calculated (Step 1020102).

In the present exemplary embodiment, instead of data e of which the number of bits is long, another data e' is used to execute registration means, revocation means and key updating means. Hence, the amount of calculation for executing these means can be reduced compared to the conventional configuration. However, from a safety viewpoint, e' should be a prime and e and e' are data having something to do with each other. Accordingly, in the present exemplary embodiment, it was assumed that e' is a prime that satisfies $e=2^{\{k\_e\}}+e'$.

Exemplary Embodiment 2

The present exemplary embodiment is different from exemplary embodiment 1 in the issuing and joining sequence and the signature means. The present exemplary embodiment will be described hereinbelow. [System Configuration], [Device Implementation], [Symbol], [Data Transmission and Reception] and [Member Public Key List] are the same as in exemplary embodiment 1, so that detailed description is omitted.

[Issuing Device Key Generating Means 120]

Figure 27:
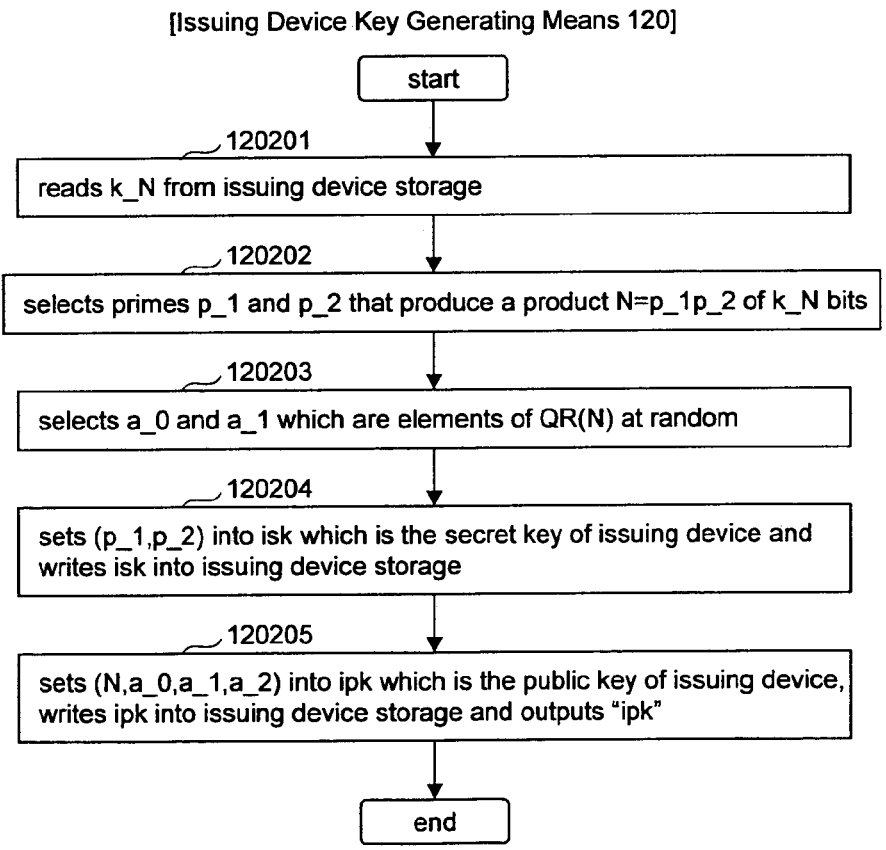
FIG. 27 is a flow chart showing an issuing device key generating means of exemplary embodiment 2.

Issuing device 100 sequentially executes ISSGEN2-1 . . . , ISSGEN2-5 as follows (FIG. 27).

ISSGEN2-1: k_N is read from issuing device storage 110 (Step 120201);

ISSGEN2-2: Primes p_1 and p_2 that produce a product N=p_1p_2 of k_N bits are selected (Step 120202);

ISSGEN2-3: a_0 and a_1 which are elements of QR(N) are selected at random (Step 120203);

ISSGEN2-4: (p_1,p_2) is set into isk which is the secret key of issuing device 100 and isk is written into issuing device storage 110 (Step 120204); and ISSGEN2-5: (N,a_0,a_1,a_2) is set into ipk which is the public key of issuing device 100, ipk is written into issuing device storage 110 and "ipk" is output (Step 120205).

From a safety viewpoint, it is preferred that both $(p\_1-1)/2$ and $(p\_2-1)/2$ at ISS2-1 are prime numbers. It is also preferred that the bit number of $p\_1$ and the bit number of $p\_2$ at ISS2-1 are approximately equal to each other.

Subsequently, [disclosing device key generating means 220] and [revocation manager key generating means 320] are executed, but these means are the same as in exemplary embodiment 1, so that detailed description is omitted.

[Issuing and Joining Means]

In the issuing and joining means, issuing device 100 and user device 400 execute issuing means 130 and joining means 420, respectively. Issuing means 130 is comprised of an issuing first means and issuing second means. Joining means 420 is comprised of a joining first means, joining second means and jointing third means.

In the issuing and joining means, the following ISSJOIN2-1, ... ISSJOIN2-9 are sequentially executed (FIG. 28).

ISSJOIN2-1: User device 400 executes the joining first means and transmits the output of the joining first means to issuing device 100 (Step 920201);

ISSJOIN2-2: Issuing device 100 writes the received data into issuing device storage 110 (Step 920202);

ISSJOIN2-3: Issuing device 100 executes issuing first means 130 and transmits the output from issuing first means 130 to user device 400 (Step 920203);

ISSJOIN2-4: User device 400 writes the received data into user device storage 410 (Step 920204);

ISSJOIN2-5: User device 400 executes the joining second means and transmits the output from the jointing second means to issuing device 100 (Step 920205);

ISSJOIN2-6: Issuing device 100 writes the received data into issuing device storage 110 (Step 920206);

ISSJOIN2-7: Issuing device 100 executes issuing second means 130 and transmits the output from issuing second means 130 to user device 400 (Step 920207);

ISSJOIN2-8: User device 400 writes the received data into user device storage 410 (Step 920208); and, ISSJOIN2-9: User device 400 executes the joining third means (Step 920209).

[Joining First Means]

Figure 29:
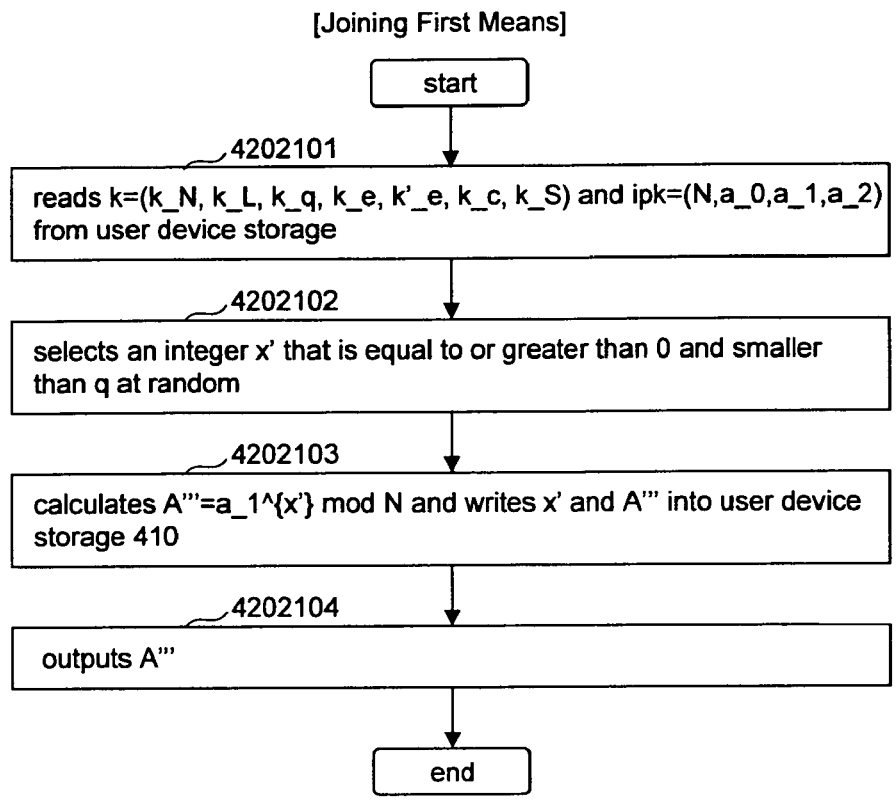
FIG. 29 is a flow chart showing a joining first means of exemplary embodiment 2.

User device 400 sequentially executes the following JOIN2-1-1, ... JOIN2-1-4 (FIG. 29).

JOIN2-1-1: $k=(k\_N, k\_L, k\_q, k\_e, k'\_e, k\_c, k\_S)$ and $ipk=(N, a\_0, a\_1, a\_2)$ are read from user device storage 410 (Step 4202101);

JOIN2-1-2: An integer x' that is equal to or greater than 0 and smaller than q is selected at random (Step 4202102);

JOIN2-1-3: $A'''=a\_1^{\{x'\}} \mod N$ is calculated and x' and A''' are written into user device storage 410 (Step 4202103); and, JOIN2-1-4: A''' is output (Step 4202104).

[Issuing First Means]

Figure 30:
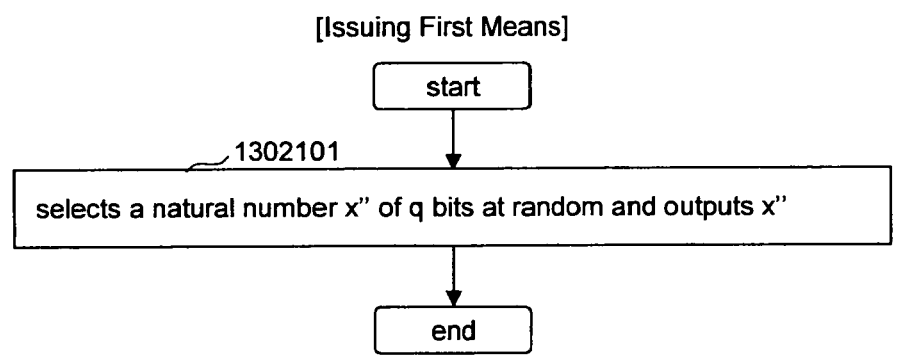
FIG. 30 is a flow chart showing an issuing first means of exemplary embodiment 2.

Issuing device 100 sequentially executes ISSUE2-1-1 as follows (FIG. 30).

ISSUE2-1-1: A natural number x" of q bits is selected at random and x" is output (Step 1302101).

[Joining Second Means]

Figure 31:
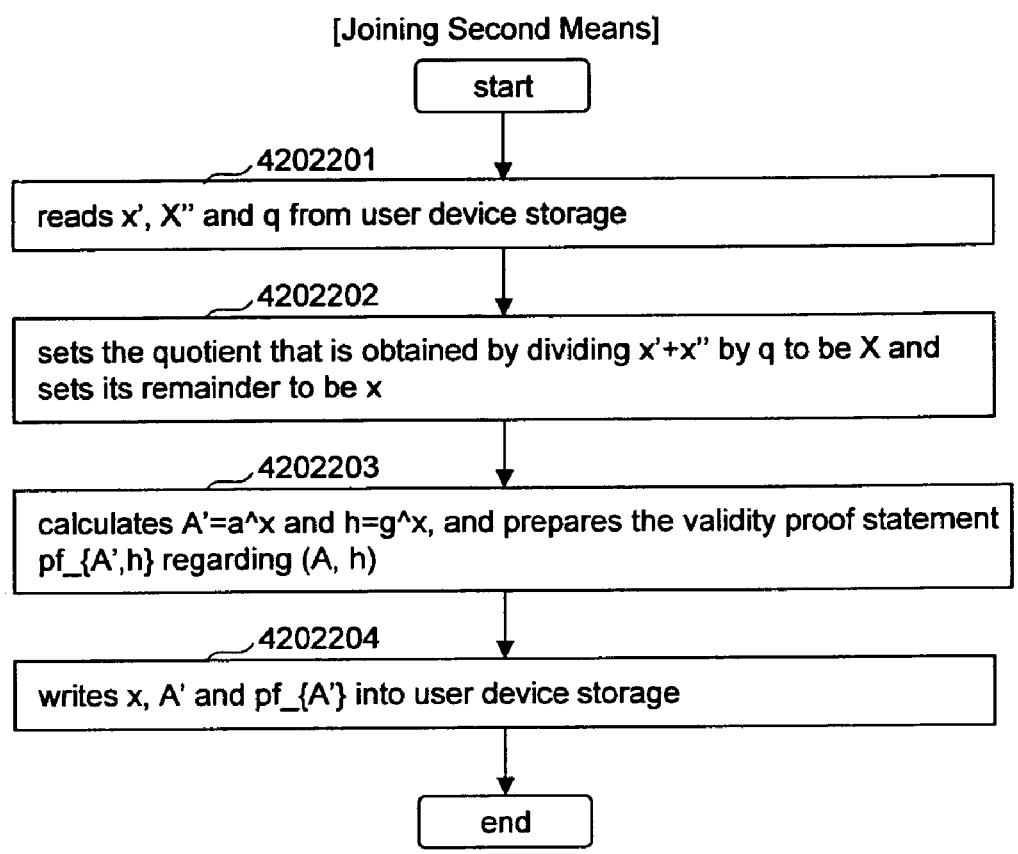
FIG. 31 is a flow chart showing a joining second means of exemplary embodiment 2.

User device 400 sequentially executes the following JOIN2-2-1, JOIN2-2-4 (FIG. 31).

JOIN2-2-1: x', X" and q are read from user device storage 410 (Step 4202201);

JOIN2-2-2: The quotient that is obtained by dividing x'+x" by q is set to be X and its remainder is set to be x (Step 4202202);

JOIN2-2-3: $A'=a^x$ and $h=g^x$ are calculated, and the validity proof statement $pf\_\{A',h\}$ regarding (A, h) is prepared (Step 4202203); and, JOIN2-2-4: x, A' and $pf\_\{A'\}$ are written into user device storage 410 (Step 4202204).

Here, the detail of the method of calculating $pf\_\{A'\}$ is disclosed in [document 1], so that the description is omitted herein.

[Issuing Second Means]

Figure 32:
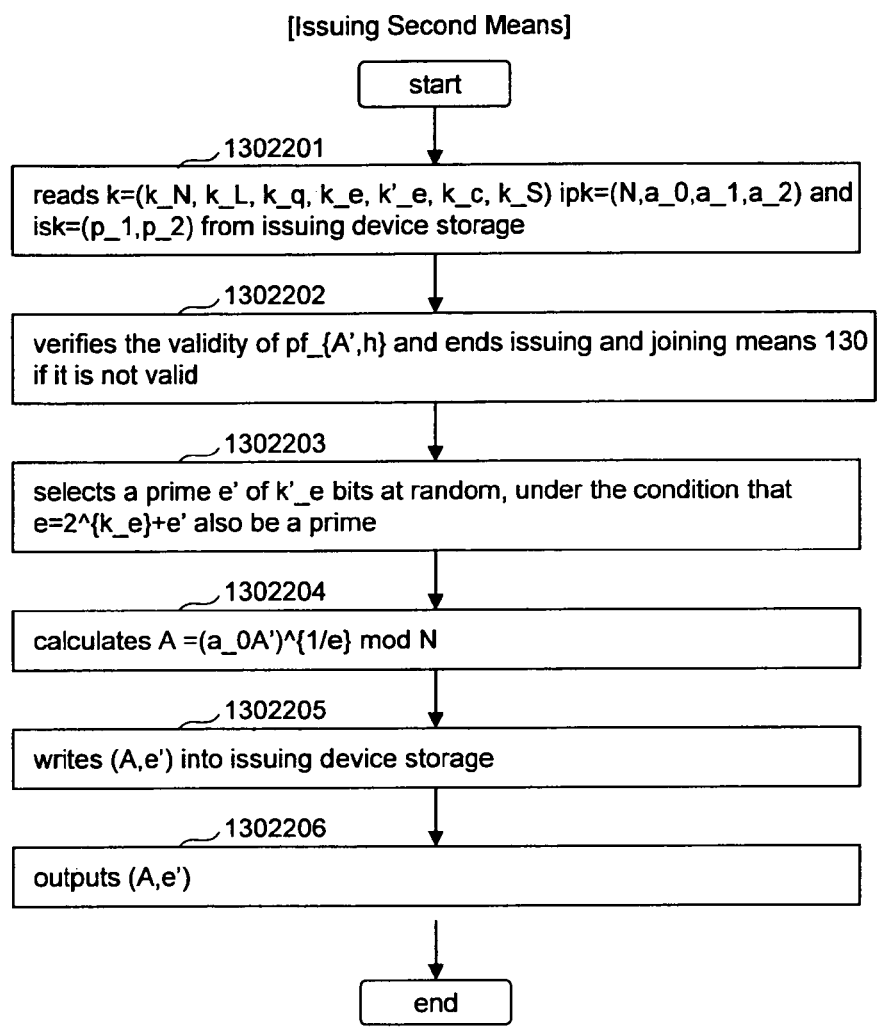
FIG. 32 is a flow chart showing an issuing second means of exemplary embodiment 2.

Issuing device 100 sequentially executes ISSUE2-2-1, ... ISSUE2-2-6 as follows (FIG. 32).

ISSUE2-2-1: $k=(k\_N, k\_L, k\_q, k\_e, k'\_e, k\_c, k\_S)$ $ipk=(N, a\_0, a\_1, a\_2)$ and $isk=(p\_1, p\_2)$ are read from issuing device storage 110 (Step 1302201);

ISSUE2-2-2: The validity of $pf\_\{A', h\}$ is verified and issuing and joining means 130 is ended if it is not valid (Step 1302202);

ISSUE2-2-3: A prime e' of $k'\_e$ bits is selected at random, under the condition that $e=2^{\{k\_e\}}+e'$ also be a prime (Step 1302203);

ISSUE2-2-4: $A=(a\_0 A')^{\{1/e\}} \mod N$ is calculated (Step 1302204);

ISSUE2-2-5: (A, e') is written into issuing device storage 110 (Step 1302205); and ISSUE2-2-6: (A, e') is output (Step 1302206).

Here, the detail of the method of verifying $pf\_\{A'\}$ is disclosed in [document 1], so that the description is omitted herein.

[Joining Third Means]

Figure 33:
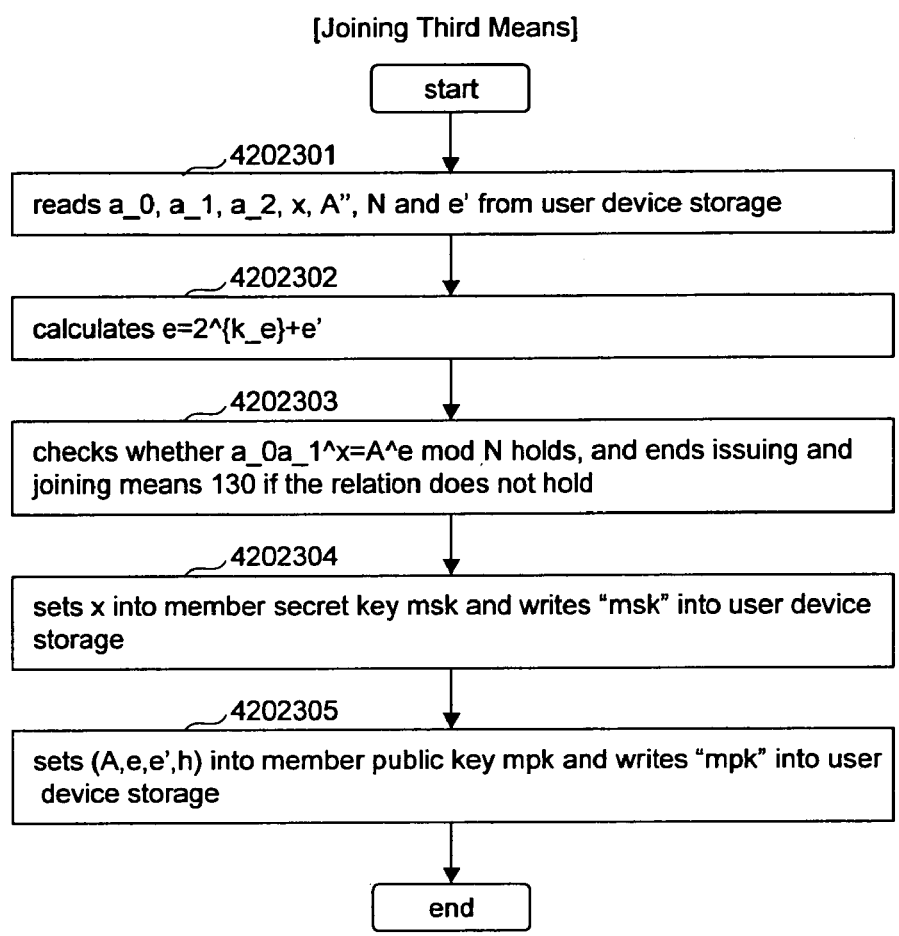
FIG. 33 is a flow chart showing a joining third means of exemplary embodiment 2.

User device 400 sequentially executes the following JOIN2-3-1, ... JOIN2-3-5 (FIG. 33).

JOIN2-3-1: $a\_0, a\_1, a\_2, x, A'', N$ and e' are read from user device storage 410 (Step 4202301);

JOIN2-3-2: $e=2^{\{k\_e\}}+e'$ is calculated (Step 4202302);

JOIN2-3-3: It is checked whether $a\_0 a\_1^x = A^e \mod N$ holds, and issuing and joining means 130 is ended if the relation does not hold (Step 4202303);

JOIN2-3-4: x is set into member secret key msk and "msk" is written into user device storage 410 (Step 4202304); and JOIN2-3-7: (A, e, e', h) is set into member public key mpk and "mpk" is written into user device storage 410 (Step 4202305).

Subsequently, [registration means 330], [revocation means 340], [key updating means 430] ad [key updating and internal function means] are executed, but these means are the same as in exemplary embodiment 1, so that detailed description is omitted.

[Signature Means 440]

Figure 35:
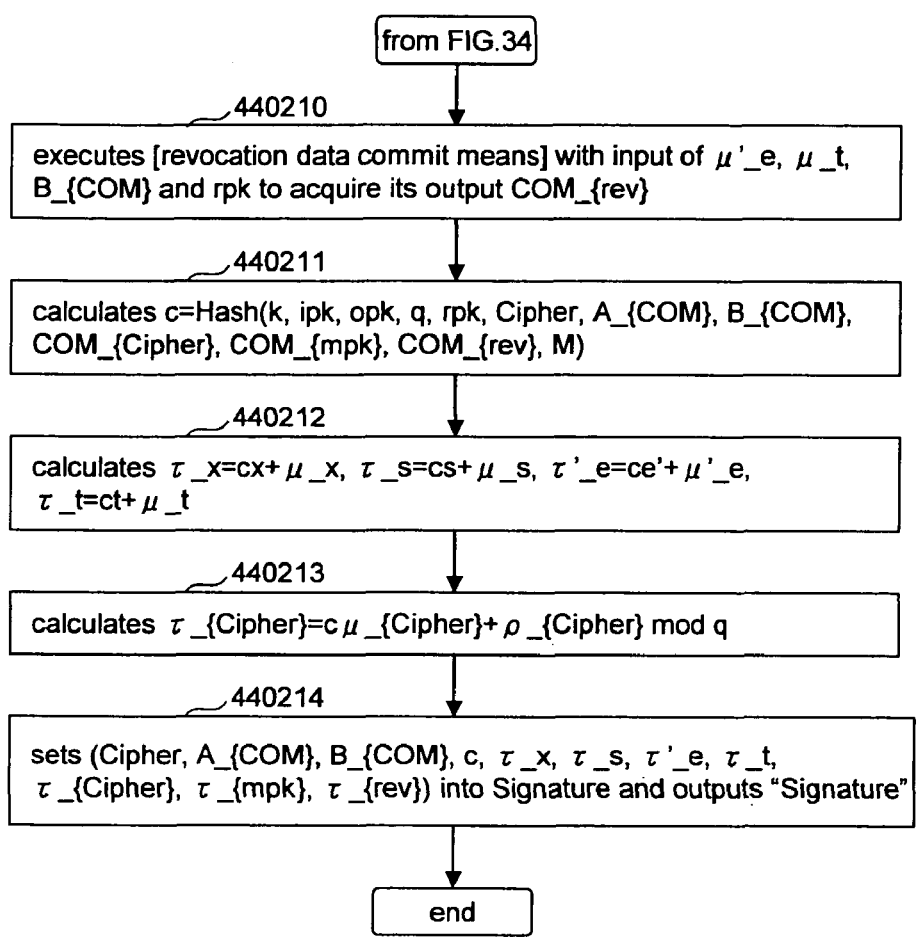
FIG. 35 is a flow chart showing a signature means of exemplary embodiment 2.

User device 400 execute SIGN1-1, ... , SIGN1-14 as follows (FIGS. 34 and 35).

SIGN1-1: $k=(k\_N, k\_L, k\_q, k\_e, k'\_e, k\_c, k\_S)$, $ipk=(N, a\_0, a\_1, a\_2)$, opk, q, $rpk=(L, b, w)$, $mpk=(A, e, e', h)$, $msk=x$ and B are read from user device storage 410 (Step 440201);

SIGN1-2: Message M is read (Step 440202);

SIGN1-3: An element $\rho\_\{Cipher\}$ of $Z\_q$ is selected at random and Cipher is calculated by using [ciphering means] (Step 440203);

SIGN1-4: A natural number s of $k\_N/2$ bits is selected at random and $A\_\{COM\}=A a\_2^{\{s\}} \mod N$ is calculated (Step 440204);

SIGN1-5: A natural number $\rho\_\{rev\}$ of $k\_L/2$ bits is selected at random and $B\_\{COM\}=B w^{\{\rho\_\{rev\}\}} \mod L$ is calculated (Step 440205);

SIGN1-6: $t=e' \rho\_\{rev\}$ is calculated (Step 440206);

SIGN1-7: A natural number $\mu\_x$ of $k\_Q+k\_c+k\_S$ bits, a natural number $\mu\_s$ of $(k\_N/2)+k\_c+k\_S$ bits, a natural number $\mu'\_e$ of $k'\_e+k\_c+k\_S$ bits, a natural number $\mu\_t$ of $(k\_L/2)+k\_c+k\_S$ bits, an element $m\_\{Cipher\}$ of $Z\_q$, a natural number $\mu\_\{mpk\}$ of $(k\_N/2)+k\_c+k\_S$ bits and a natural number $\mu\_\{rev\}$ of $(k\_L/2)+k\_c+k\_S$ bits are selected, at random (Step 440207);

SIGN1-8: [cipher statement commit means] is executed with input of Cipher, $\mu\_x$, $\mu\_\{Cipher\}$, opk and g to acquire its output COM_{Cipher} (Step 440208);

SIGN1-9: [member public key commit means] is executed with input of $\mu\_x$, $\mu\_s$, $\mu'\_e$, A_{COM} and ipk to acquire its output COM_{mpk} (Step 440209);

SIGN1-10: [revocation data commit means] is executed with input of $\mu'\_e$, $\mu\_t$, B_{COM} and rpk to acquire its output COM_{rev} (Step 440210);

SIGN1-11: c=Hash(k, ipk, opk, q, rpk, Cipher, A_{COM}, B_{COM}, COM_{Cipher}, COM_{mpk}, COM_{rev}, M) is calculated (Step 440211);

SIGN1-12: $\tau\_x=cx+\mu\_x, \tau\_s=cs+\mu+s, \tau'\_e=ce'+\mu'\_e, \tau\_t=ct+\mu\_t$ are calculated (Step 440212);

SIGN1-13: $\tau\_\{Cipher\}=c\mu\_\{Cipher\}+\rho\_\{Cipher\}$ mod q is calculated (Step 440213); and SIGN1-14: (Cipher, A_{COM}, B_{COM}, c, $\tau\_x, \tau\_s, \tau'\_e, \tau\_t, \tau\_\{Cipher\}, \tau\_\{mpk\}, \tau\_\{rev\}$) is set into Signature and "Signature" is output (Step 440214).

Thereafter, [cipher statement commit means], [member public key commit means], [revocation data commit means], [verifying means 520], [cipher statement commit regenerating means], [member public key commit regenerating means], [revocation data commit regenerating means], [disclosing means 230], [cipher key generating means], [ciphering means] and [decoding means] are executed. These means are, however, the same as in exemplary embodiment 1, so that detailed description is omitted.

Also in the present exemplary embodiment, instead of data e of which the number of bits is long, another data e' is used to execute registration means, revocation means and key updating means. Hence, the amount of calculation for executing these means can be reduced compared to the conventional configuration.

Also, it goes without saying that the present invention is not limited to the above examples, and various changes can be made within the scope of the invention and should be also included in the scope of the present invention.

The invention claimed is:

1. A group signature system including an issuing device, a disclosing device, a revocation manager, a user device and a verifying device, being connected to each other via a network,
said issuing device including an issuing device storage in which elements of a first cyclic group are stored, and an issuing device controller which, when issuing device public key ipk of a set that includes order N of said first cyclic group and elements a_0, a_1 and a_2 of said first cyclic group is generated, discloses said issuing device public key ipk,
said user device including a user device storage in which a set of primes are stored, and a user device controller which, when receiving said disclosed issuing device public key ipk, determines such primes e and e' that e' is a prime that is obtained by subtracting a fixed number smaller than said prime e from said prime e, generates user device secret key msk of a set including such numbers x and r that a product between said a_0 and a result obtained by performing modular exponentiation of said a_1 by number x, multiplied by a result obtained by performing modular exponentiation of said a_2 by number r, is equal to a result obtained by performing element A of said first cyclic group raised to the power of said prime e, based on said order N as a modulus, and generates user device public key mpk of a set including said prime e, said prime e' and said element A, transmits said prime e' to said revocation manager, and when receiving B calculated based on said prime e' from said revocation manager to obtain a message, generates a signature statement for said message by using said B value, said user device public key mpk, said user device secret key msk and said message, and transmits said message and said signature statement to said verifying device,
said revocation manager including a revocation manager storage in which a second cyclic group is stored, and a revocation manager controller which generates revocation manager public key rpk of a set including order L of said second cyclic group and element b of said second cyclic group, and when receiving from said prime e' from said user device, calculates said B value that is obtained by performing modular exponentiation of said element b raised to the power of the inverse of said prime e' based on said order L as a modulus, and transmits said B to said user device,
said verifying device including a verifying device storage for storing said message and said signature statement, and a verifying device controller which, when receiving said message and said signature statement, performs verification by using said message and a signature statement candidate to verify a validity of said signature statement candidate and outputs whether said signature statement candidate is valid or not, and
said disclosing device including a disclosing device storage for storing said message and said signature statement, and a disclosing device controller which, when receiving said message and said signature statement to confirm that said signature statement is valid, calculates h by decoding based on said message, said signature statement, generated disclosing device public key opk and disclosing device secret key osk and outputs said h.

2. The group signature system according to claim 1, wherein said revocation manager controller calculates said B value by using said revocation manager public key rpk and said prime e' of a user device that leaves a group, and replaces said element b with said B value and updates said revocation manager public key rpk with that of a set that includes said order L and said B value.

3. The group signature system according to claim 2, wherein said revocation manager controller discloses said updated revocation manager public key rpk, said user device controllers of user devices remaining in said group, when receiving said updated revocation manager public key rpk, determine such integers $\xi$ and $\eta$ that the sum of integer $\xi$ multiplied by said e'_0 and integer $\eta$ multiplied by said prime e' is equal to 1, based on said prime e' of said user device that left said group and e'_0 defined as e'_0=e and said B value, then calculate B' that is obtained by performing a modulo operation for a product of said B value raised to the power of $\xi$ and said B value that has replaced said element b, raised to the power of $\eta$, with said order L as a modulus, and updates said B value by said B' value.

4. The group signature system according to claim 1, wherein said user device controller, when receiving said B value, determines said signature statement to be a prove statement of said B knowledge, based on issuing device public key ipk, revocation manager public key rpk, user device public key mpk, user device secret key msk and said B value.

5. The group signature system according to claim 4, wherein said user device controller, when receiving said B value, selects random number $\mu'\_e$, random number $\mu\_t$ and random number $\rho\_\{rev\}$ arbitrarily, calculates B_{COM} that is obtained by performing modular exponentiation of a product of a predetermined value w raised to the power of $\rho\_\{rev\}$ and said B value, over said order L as a modulus, calculates t that is a product of said prime e' and said $\rho\_\{rev\}$, calculates COM_{rev} that is obtained by performing modular exponentiation of a product of said value w raised to the power of said $\mu\_t$ and said B_{COM} raised to the power of $\mu'\_e$ multiplied by −1, based on said order L as a modulus, calculates COM_{mpk} to be a member public key commit from said issuing device public key ipk, calculates Hash value c of a set including said B_{COM}, said COM_{rev} and said COM_{mpk}, calculates $\tau'\_e$ that is the sum of said hash value c multiplied by said prime e' and said $\mu'\_e$, further calculates $\tau\_t$ that is the sum of said hash value c multiplied by said t value and $\mu\_t$, and outputs a set including said $\tau'\_e$ and said $\tau\_t$ as said signature statement.

6. The group signature system according to claim 1, wherein said user device controller, when receiving said B value, selects random number $\mu\_x$, random number $\mu\_s$, random number $\rho\_\{mpk\}$ and random number $\rho\_\{mpk\}$ arbitrarily, calculates A_{COM} that is obtained by performing modular exponentiation for said a_2 raised to $\rho\_\{mpk\}$ multiplied by said element A, over said order N as a modulus, calculates s that is the sum of said prime e multiplied by said $\rho\_\{mpk\}$ and said r, calculates as a member public key commit, COM_{mpk} that is obtained by performing modular exponentiation for a product of said a_1 raised to the power of said $\mu\_x$ and said a_2 raised to the power of said $\mu\_s$, by said A_{COM} raised to the power of $\mu\_e$ multiplied by −1, calculates B_{COM} that is obtained by performing modular exponentiation of a product of a predetermined value w raised to the power of $\rho\_\{rev\}$ and said B value, over said order L as a modulus, calculates t that is a product of said prime e' and said $\rho\_\{rev\}$, calculates COM_{rev} that is obtained by performing modular exponentiation of a product of said value w raised to the power of said $\mu\_t$ and said B_{COM} raised to the power of $\mu'\_e$ multiplied by −1, based on said order L as a modulus, calculates Hash value c of a set including said B_{COM}, said COM_{rev}, said A_{COM} and said COM_{mpk}, calculates $\tau\_x$ that is the sum of said Hash value c multiplied by said number x and said $\mu\_x$, calculates $\tau\_s$ that is the sum of said Hash value c multiplied by said number s and said $\mu\_s$ and outputs said signature statement with a set including said $\tau'\_e$, said $\tau\_t$ and said $\tau\_s$ as a knowledge proof statement.

7. A group signature system including an issuing device, a disclosing device, a revocation manager, a user device and a verifying device, being connected to each other via a network,
said issuing device including an issuing device storage in which elements of a first cyclic group are stored, and an issuing device controller, which, when issuing device public key ipk of a set that includes order N of said first cyclic group and elements a_0 and a_1 of said first cyclic group is generated, discloses said issuing device public key ipk,
said user device including a user device storage in which a set of primes are stored, and a user device controller which, when receiving said disclosed issuing device public key ipk, determines such primes e and e' that e' is a prime that is obtained by subtracting a fixed number smaller than said prime e from said prime e, generates user device secret key msk including such number x that a product between said a_0 and a result obtained by performing modular exponentiation of said a_1 by number x is equal to a result obtained by performing element A of said first cyclic group raised to the power of said prime e, based on said order N as a modulus, and generates user device public key mpk of a set including said prime e, said prime e' and said element A, transmits said prime e' to said revocation manager, and when receiving B calculated based on said prime e' from said revocation manager to obtain a message, generates a signature statement for said message by using said B value, said user device public key mpk, said user device secret key msk and said message, and transmits said message and said signature statement to said verifying device,
said revocation manager including a revocation manager storage in which a second cyclic group is stored, and a revocation manager controller which generates revocation manager public key rpk of a set including order L of said second cyclic group and element b of said second cyclic group, and when receiving from said prime e' from said user device, calculates said B value that is obtained by performing modular exponentiation of said element b raised to the power of the inverse of said prime e' based on said order L as a modulus, and transmits said B to said user device,
said verifying device including a verifying device storage for storing said message and said signature statement, and a verifying device controller which, when receiving said message and said signature statement, performs verification by using said message and said signature statement candidate to verify a validity of a signature statement candidate and outputs whether said signature statement candidate is valid or not, and
said disclosing device including a disclosing device storage for storing said message and said signature statement, and a disclosing device controller which, when receiving said message and said signature statement to confirm that said signature statement is valid, calculates h by decoding based on said message, said signature statement, generated disclosing device public key opk and disclosing device secret key osk and outputs said h.

8. The group signature system according to claim 7, wherein said revocation manager controller calculates said B value by using said revocation manager public key rpk and said prime e' of a user device that leaves a group, and replaces said element b with said B value and updates said revocation manager public key rpk with that of a set that includes said order L and said B value.

9. The group signature system according to claim 8, wherein said revocation manager controller discloses said updated revocation manager public key rpk, said user device controllers of user devices remaining in said group, when receiving said updated revocation manager public key rpk, determine such integers ξ and η that the sum of integer ξ multiplied by said e'_0 and integer η multiplied by said prime e' is equal to 1, based on said prime e' of said user device that left said group and e'_0 defined as e'_0=e and said B value, then calculate B' that is obtained by performing a modulo operation for a product of said B value raised to the power of ξ and said B value that has replaced said element b, raised to the power of η, with said order L as a modulus, and updates said B value by said B' value.

10. The group signature system according to claim 7, wherein said user device controller, when receiving said B value, determines said signature statement to be a prove statement of said B knowledge, based on issuing device public key ipk, revocation manager public key rpk, user device public key mpk, user device secret key msk and said B value.

11. The group signature system according to claim 10, wherein said user device controller, when receiving said B value, selects random number $\mu'\_e$, random number $\mu\_t$ and random number $\rho\_\{rev\}$ arbitrarily, calculates B_{COM} that is obtained by performing modular exponentiation of a product of a predetermined value w raised to the power of $\rho\_\{rev\}$ and said B value, over said order L as a modulus, calculates t that is a product of said prime e' and said $\rho\_\{rev\}$, calculates COM_{rev} that is obtained by performing modular exponentiation of a product of said value w raised to the power of said $\mu\_t$ and said $B\_\{COM\}$ raised to the power of $\mu'\_e$ multiplied by −1, based on said order L as a modulus, calculates COM_{mpk} to be a member public key commit from said issuing device public key ipk, calculates Hash value c of a set including said B_{COM}, said COM_{rev} and said COM_{mpk}, calculates $\tau'\_e$ that is the sum of said hash value c multiplied by said prime e' and said $\mu'\_e$, further calculates $\tau\_t$ that is the sum of said hash value c multiplied by said t value and $\mu\_t$, and outputs a set including said $\tau'\_e$ and said $\tau\_t$ as said signature statement.

12. The group signature system according to claim 7, wherein said user device controller, when receiving said B value, selects random number $\mu\_x$, random number $\mu\_s$, random number $\rho\_\{mpk\}$ and random number $r\_\{mpk\}$ arbitrarily, calculates $A\_\{COM\}$ that is obtained by performing modular exponentiation of said $a\_2$ raised to $\rho\_\{mpk\}$ multiplied by said element A, over said order N as a modulus, calculates s that is said prime e multiplied by said $\rho\_\{mpk\}$, calculates as a member public key commit, COM_{mpk} that is obtained by performing modular exponentiation of a product of said $a\_1$ raised to the power of said $\mu\_x$ and said $a\_2$ raised to the power of said $\mu\_s$, multiplied by said A{COM} raised to the power of $\mu\_e$ multiplied by −1, calculates B_{COM} that is obtained by performing modular exponentiation of a product of a predetermined value w raised to the power of $\rho\_\{rev\}$ and said B value, over said order L as a modulus, calculates t that is a product of said prime e' and said $\rho\_\{rev\}$, calculates COM_{rev} that is obtained by performing modular exponentiation of a product of said value w raised to the power of said $\mu\_t$ and said $B\_\{COM\}$ raised to the power of $\mu'\_e$ multiplied by −1, based on said order L as a modulus, calculates Hash value c of a set including said B_{COM}, said COM_{rev}, said A_{COM} and said COM_{mpk}, calculates $\tau\_x$ that is the sum of said Hash value c multiplied by said number x and said $\mu\_x$, calculates $\tau\_s$ that is the sum of said Hash value c multiplied by said number s and said $\mu\_s$ and outputs said signature statement with a set including said $\tau'\_e$, said $\tau\_t$ and said $\tau\_s$ as a knowledge proof statement.

13. An information processing method based on a group signature system including an issuing device, a disclosing device, a revocation manager, a user device and a verifying device, being connected to each other via a network, comprising of:

said issuing device, when generating issuing device public key ipk of a set that includes order N of a first cyclic group and elements $a\_0$, $a\_1$ and $a\_2$ of said first cyclic group, disclosing said issuing device public key ipk;

said user device, when receiving said disclosed issuing device public key ipk, determining such primes e and e' that e' is a prime that is obtained by subtracting a fixed number smaller than said prime e from said prime e; generating user device secret key msk of a set including such numbers x and r that a product between said $a\_0$ and a result obtained by performing modular exponentiation of said $a\_1$ by number x, multiplied by a result obtained by performing modular exponentiation of said $a\_2$ by number r, is equal to a result obtained by performing element A of said first cyclic group raised to the power of said prime e, based on said order N as a modulus, and generating user device public key mpk of a set including said prime e, said prime e' and said element A; transmitting said prime e' to said revocation manager;

said revocation manager generating revocation manager public key rpk of a set including order L of a second cyclic group and element b of said second cyclic group; and when receiving from said prime e' from said user device, calculating said B value that is obtained by performing modular exponentiation of said element b raised to the power of the inverse of said prime e' based on said order L as a modulus, and transmitting said B to said user device;

said user device, when receiving said B value from said revocation manager and have a message input, generating a signature statement for said message by using said B value, said user device public key mpk, said user device secret key msk and said message; and transmitting said message and said signature statement to said verifying device;

said verifying device, when receiving said message and said signature statement, performing verification by using said message and a signature statement candidate to verify a validity of said signature statement candidate and outputting whether said signature statement candidate is valid or not; and said disclosing device, when receiving said message and said signature statement and confirming that said signature statement is valid, calculating h by decoding based on said message, said signature statement, generated disclosing device public key opk and disclosing device secret key osk and outputting said h.

14. The information processing method according to claim 13, wherein said revocation manager calculates said B value by using said revocation manager public key rpk and said prime e' of a user device that leaves a group, and replaces said element b with said B value and updates said revocation manager public key rpk with a set that includes said order L and said B value.

15. The information processing method according to claim 14, wherein said revocation manager discloses said updated revocation manager public key rpk, said user devices remaining in said group determines such integers $\xi$ and $\eta$ that the sum of integer $\xi$ multiplied by said $e'\_0$ and integer $\eta$ multiplied by said prime e' is equal to 1 based on said updated revocation manager public key rpk, said prime e' of said user device that left said group and $e'\_0$ defined as $e'\_0=e$ and said B value, then calculates B' that is obtained by performing a modulo operation for a product of said B value raised to the power of $\xi$ and said B value that has replaced said element b, raised to the power of $\eta$, with said order L as a modulus, and updates said B value by said B' value.

16. An information processing method based on a group signature system including an issuing device, a disclosing device, a revocation manager, a user device and a verifying device, being connected to each other via a network, comprising of:

said issuing device, when generating issuing device public key ipk of a set that includes order N of a first cyclic group and elements $a\_0$ and $a\_1$ of said first cyclic group, disclosing said issuing device public key ipk;

said user device, when receiving said disclosed issuing device public key ipk, determining such primes e and e' that e' is a prime that is obtained by subtracting a fixed number smaller than said prime e from said prime e; generating user device secret key msk including such number x that a product between said $a\_0$ and a result obtained by performing modular exponentiation of said $a\_1$ by number x is equal to a result obtained by performing element A of said first cyclic group raised to the power of said prime e, based on said order N as a modulus, and a user device public key mpk of a set including said prime e, said prime e' and said element A; transmitting said prime e' to said revocation manager;

said revocation manager generating revocation manager public key rpk of a set including order L of a second cyclic group and element b of said second cyclic group; and when receiving from said prime e' from said user device, calculating said B value that is obtained by performing modular exponentiation of said element b raised to the power of the inverse of said prime e' based on said order L as a modulus, and transmitting said B to said user device;

said user device, when receiving said B value from said revocation manager and receiving a message as input, generating a signature statement for said message by using said B value, said user device public key mpk, said user device secret key msk and said message; and transmitting said message and said signature statement to said verifying device;

said verifying device, when receiving said message and said signature statement, performing verification by using said message and said signature statement candidate to verify a validity of a signature statement candidate and outputting whether said signature statement candidate is valid or not; and said disclosing device, when receiving said message and said signature statement and confirming that said signature statement is valid, calculating h by decoding based on said message, said signature statement, said generated disclosing device public key opk and disclosing device secret key osk and outputting said h.

17. The information processing method according to claim 16, wherein said revocation manager calculates said B value by using said revocation manager public key rpk and said prime e' of a user device that leaves a group, and replaces said element b with said B value and updates said revocation manager public key rpk with a set that includes said order L and said B value.

18. The information processing method according to claim 17, wherein said revocation manager discloses said updated revocation manager public key rpk, said user devices remaining in said group determines such integers $\xi$ and $\eta$ that the sum of integer $\xi$ multiplied by said e'_0 and integer $\eta$ multiplied by said prime e' is equal to 1 based on said updated revocation manager public key rpk, said prime e' of said user device that left said group and e'_0 defined as e'_0=e and said B value, then calculates B' that is obtained by performing a modulo operation for a product of said B value raised to the power of $\xi$ and said B value that has replaced said element b, raised to the power of $\eta$, with said order L as a modulus, and updates said B value by said B' value.

* * * * *